United States Patent
Song et al.

(10) Patent No.: US 8,134,943 B2
(45) Date of Patent: Mar. 13, 2012

(54) REPEATING MULTICAST MESSAGE TRANSMISSIONS IN A WIRELESS COMMUNICATIONS SYSTEM

(75) Inventors: Bongyong Song, San Diego, CA (US); Arulmozhi Ananthanarayanan, San Diego, CA (US); Arvind V. Santhanam, San Diego, CA (US); Harleen Gill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 594 days.

(21) Appl. No.: 12/364,299

(22) Filed: Feb. 2, 2009

(65) Prior Publication Data
US 2010/0195554 A1 Aug. 5, 2010

(51) Int. Cl.
*H04H 20/71* (2008.01)
(52) U.S. Cl. .................. 370/312; 455/416.1; 455/416.2
(58) Field of Classification Search .................. None
See application file for complete search history.

(56) References Cited

U.S. PATENT DOCUMENTS

| | | | |
|---|---|---|---|
| 5,274,837 A | 12/1993 | Childress et al. | |
| 6,223,286 B1 | 4/2001 | Hashimoto | |
| 2006/0104275 A1* | 5/2006 | Dohm | 370/390 |
| 2008/0192661 A1* | 8/2008 | Hamamoto et al. | 370/310 |

FOREIGN PATENT DOCUMENTS

| | | |
|---|---|---|
| EP | 1903523 | 3/2008 |
| WO | 0069190 | 11/2000 |
| WO | 2004064359 | 7/2004 |

OTHER PUBLICATIONS

International Search Report, PCT/US2009/050739, International Searching Authority, European Patent Office, Nov. 12, 2009.
Written Opinion, PCT/US2009/050739, International Searching Authority, European Patent Office, Nov. 12, 2009.

* cited by examiner

*Primary Examiner* — Jianye Wu
(74) *Attorney, Agent, or Firm* — Raphael Freiwirth

(57) ABSTRACT

In an embodiment, an application server determines a priority associated with a given multicast message for transmission to at least one access terminal, configures the given multicast message to indicate the priority of the given multicast message and forwards the configured multicast message to an access network for transmission to the at least one access terminal a number of times based at least in part on the indicated priority. Alternatively, the application server can indicate, in the configured multicast message, the number of times to transmit the given multicast message. The priority, or number of times to transmit the given multicast message, can be conveyed to the access network by a flag inserted into the configured multicast message by the application server. The access network determines the number of times to transmit the given multicast message to the at least one access terminal based on the flag.

66 Claims, 16 Drawing Sheets

REPEATING MULTICAST MESSAGE TRANSMISSIONS IN A WIRELESS COMMUNICATIONS SYSTEM

BACKGROUND OF THE INVENTION

1. Field of the Invention

The invention relates to repeating multicast message transmissions in a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment of the invention, an application server determines a priority associated with a given multicast message for transmission to at least one access terminal, configures the given multicast message to indicate the priority of the given multicast message and forwards the configured multicast message to an access network for transmission to the at least one access terminal a number of times based at least in part on the indicated priority. In an alternative embodiment of the invention, the application server can indicate, in the configured multicast message, the number of times to transmit the given multicast message. The priority, or alternatively number of times to transmit the given multicast message, can be conveyed to the access network by a flag inserted into the configured multicast message by the application server. The access network determines the number of times to transmit the given multicast message to the at least one access terminal based on the flag, and then transmits the given multicast message the determined number of times to the at least one access terminal.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
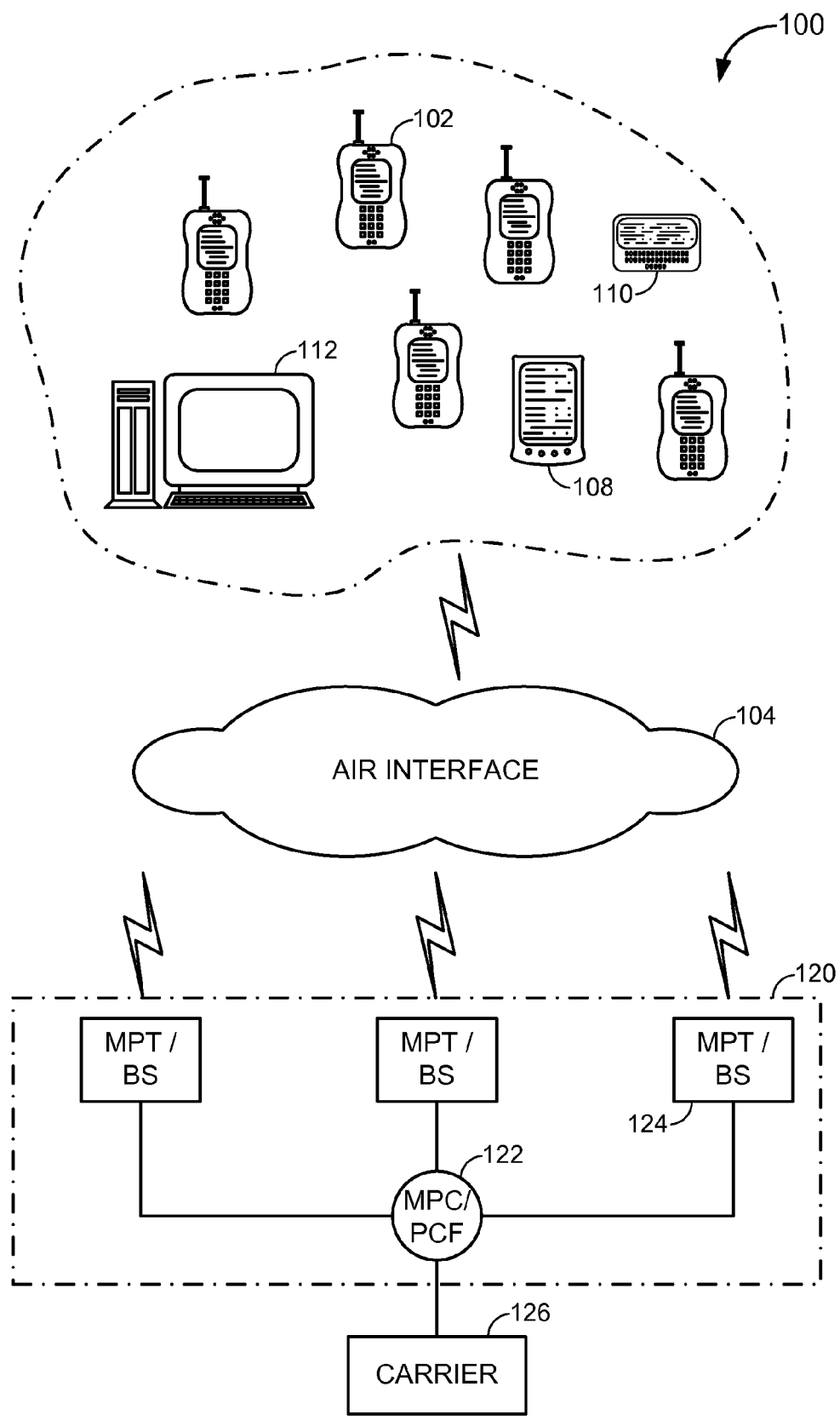
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
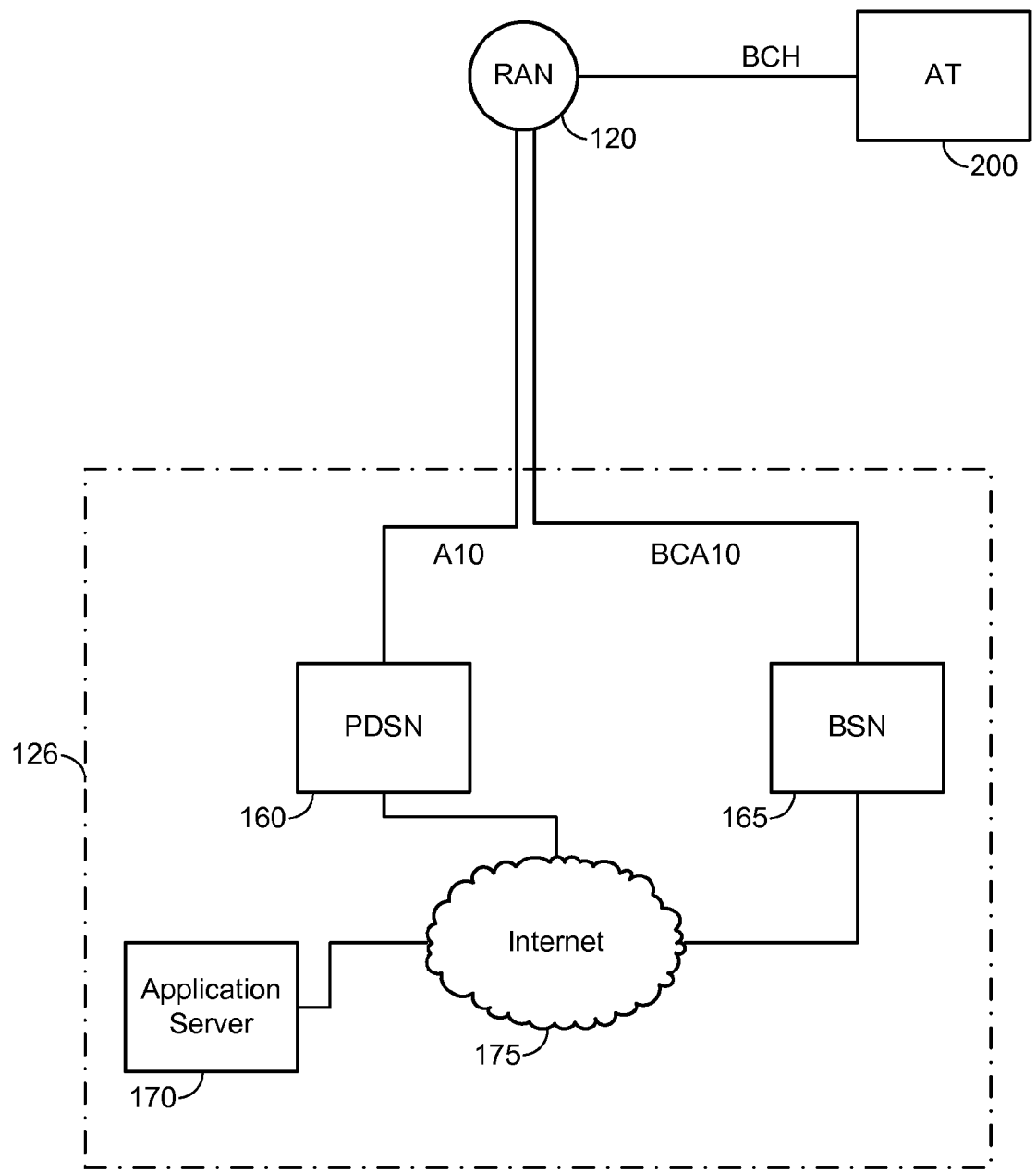
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
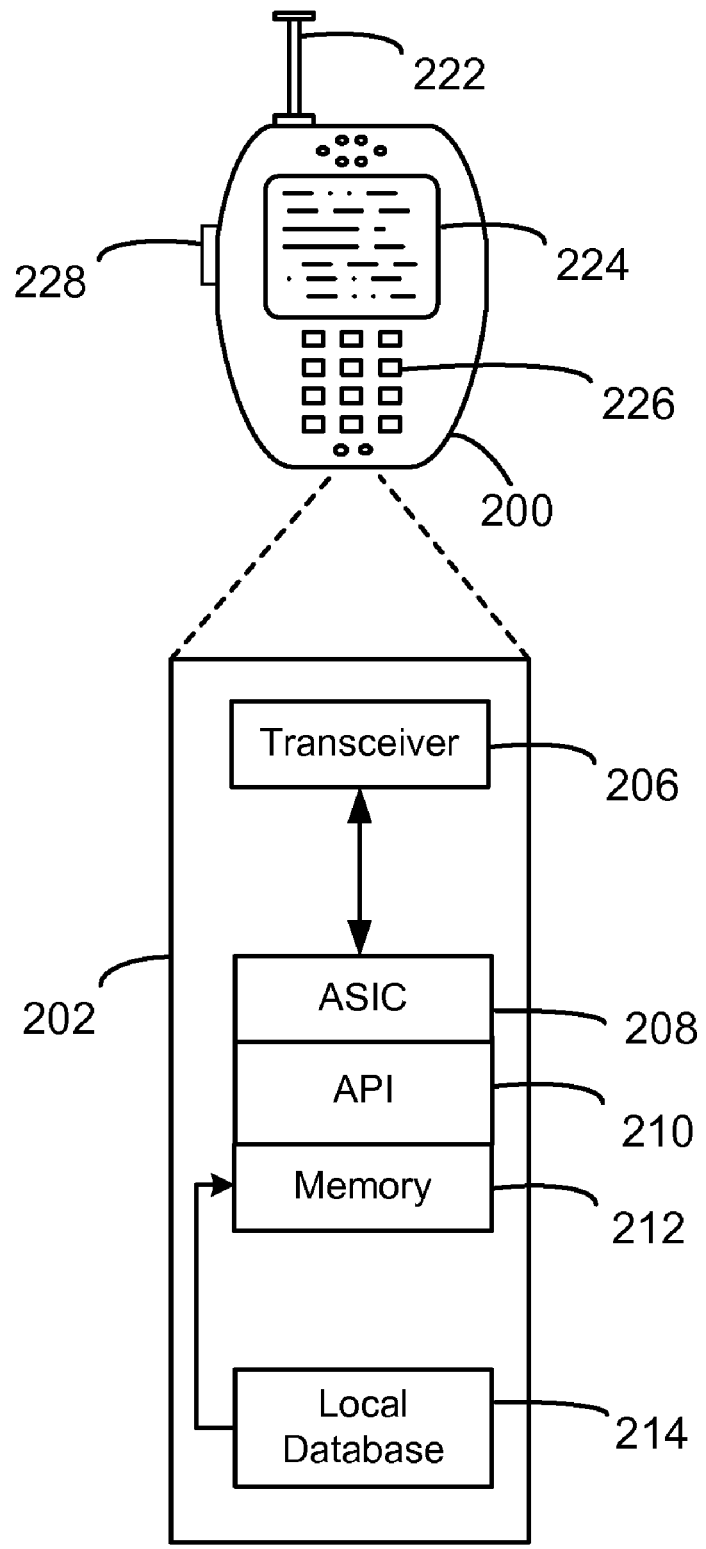
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

For convenience of explanation, a description of conventional multicast message transmissions is provided, followed by a description of message transmissions according to embodiments of the present invention, also with reference to multicast transmissions. For some multicast messages, it is important to deliver one or more messages to all multicast group members as soon as possible, as the loss of the message can result in degradation of multicasting quality. For example, loss of a multicast call announcement message at any given group member will result in that group member's failure to participate in the call. In this case, the given group member would not even be aware that a multicast call is taking place.

Access terminals participating in unicast communications are typically provided with a reverse link channel on which to transmit feedback to the RAN (e.g., a measured SIR level, ACK, NACK, etc.) such that, for example, the RAN can adjust downlink transmission power to a particular access terminal. In multicast sessions, however, because a potentially large number of access terminals are participating in the multicast session, permitting the access terminals to transmit feedback may overload the reverse link feedback or access channel and/or increase the complexity of power control for the forward link multicast transmissions. Thus, conventional multicasting implementations do not typically enable individual multicast group members to transmit feedback relating to the multicast transmissions (e.g., a measured SIR level, ACK, NACK, etc.). Therefore, ensuring delivery of a multicast message to all multicast group members is challenging.

Figure 4:
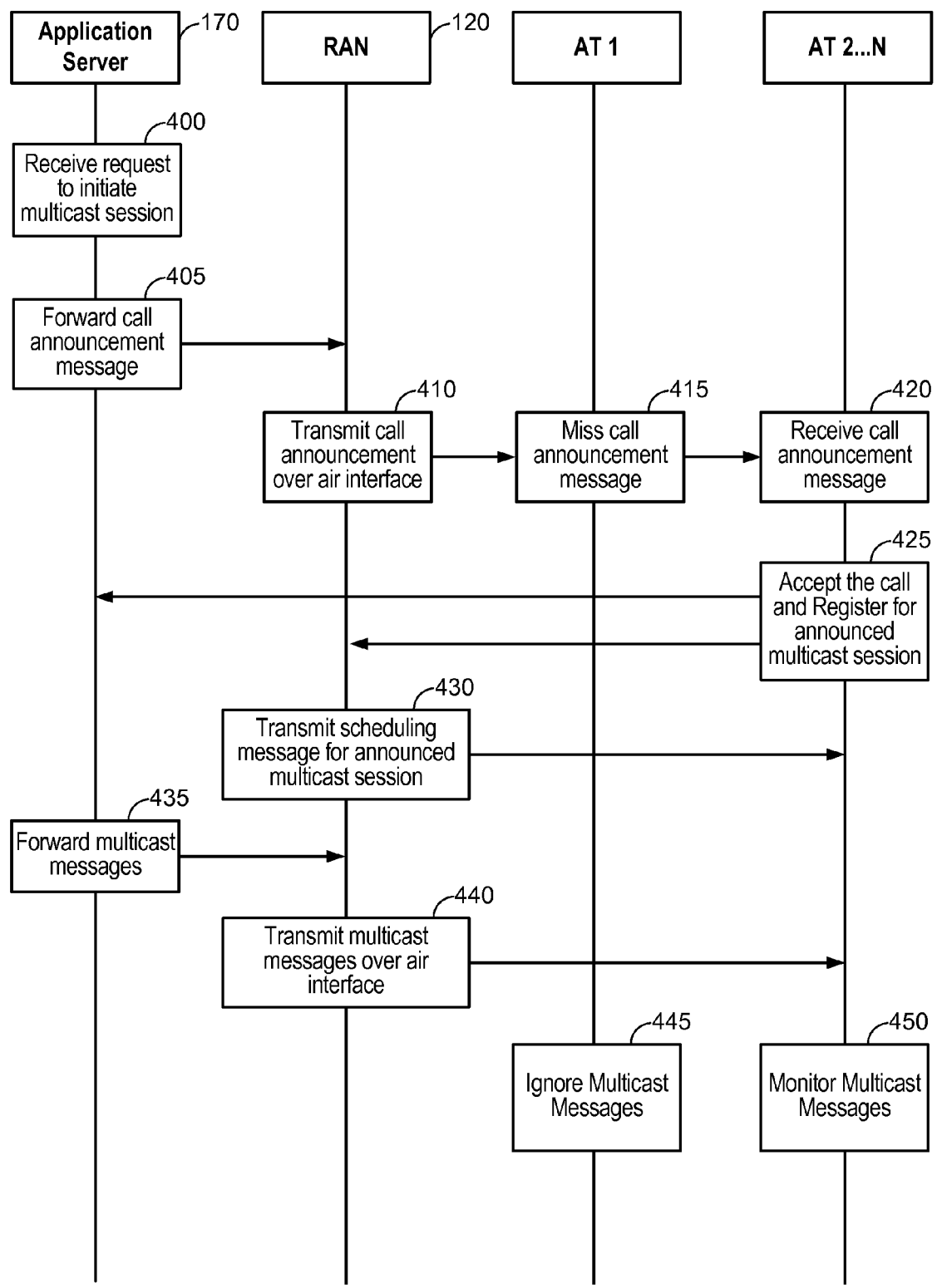
FIG. 4 illustrates a conventional multicast call setup process.

FIG. 4 illustrates a conventional multicast call setup process. Referring to FIG. 4, the application server 170 (e.g., a push-to-talk (PTT) or broadcast multicast service (BCMCS) server) receives a request to initiate a multicast session, 400 (e.g., from a PTT initiator). The application server 170 generates a call announcement message for announcing the multicast session to one or more multicast group members denoted as ATs 1 . . . N (e.g., wherein N>=1), and forwards the call announce message to the RAN 120, 405. The RAN 120 receives the call announce message and transmits the call announce message in a plurality of sectors of the wireless communication system 100, 410. For example, the RAN 120 may transmit the call announce message on a next physical layer packet.

Next, assume that AT 1 misses the call announce message, 415, and that ATs 2 . . . N receive and decode the call announce message. For example, AT 1 may miss the call announce message if AT 1 is not turned on, is located in a high-interference area of a serving sector, etc. Next, ATs 2 . . . N accept the call by sending a call accept message to the application server 170. At the same time, ATs 2 . . . N register for the multicast session by sending a registration message to the RAN 120 (e.g., a BCMCSFlowRegistration message), 425. However no messages are transmitted from AT 1 because AT 1 missed the call announce message and is therefore unaware of the multicast session.

The RAN 120 transmits a scheduling message for the announced multicast session, 430, that advertises a flow ID for the multicast session and includes instructions with regard to how access terminals can tune to the multicast session. For example, the scheduling message can be a broadcast overhead message (BOM) that includes listing of a BCMCSFlowID for the multicast session along with an interlace-multiplex (IM) pair that carries the multicast session on a downlink broadcast channel (BCH). The scheduling message is received by ATs 2 . . . N, which are aware that the multicast session has been announced, as discussed above. Those ATs who have not transmitted the Accept Call (or announce ACK) and registration messages may suppress their responses once they receive the scheduling message as described in U.S. Provisional Application No. 60/974,831, entitled "METHODS OF MANAGING ACKNOWLEDGMENT TRANSMISSIONS FROM MULTICAST GROUP MEMBERS OF A MULTICAST GROUP WITHIN A WIRELESS COMMUNICATIONS NETWORK", filed on Sep. 24, 2007, assigned by the assignee hereof, and expressly incorporated by reference herein in its entirety.

Next, the application server 170, after receiving a first Accept Call message (or announce ACK message), begins to forward multicast messages to the RAN 120 for transmission, 435. The RAN 120 receives the forwarded multicast messages and transmits the multicast messages at least within sectors including one or more ATs that have registered for the multicast session, 440. As will be appreciated by one of ordinary skill in the art, AT 1 ignores the multicast messages because AT 1 is still unaware that the multicast session has been initiated, 445, whereas ATs 2 . . . N monitor the multicast messages (e.g., on the BCH) in accordance with the scheduling message, 450.

As will be appreciated by one of ordinary skill in the art, it is difficult to ensure that each target AT receives a call announce message to a multicast session because the RAN 120 does not necessarily receive feedback (e.g., an ACK or NACK) that would permit the RAN 120 to distinguish between ATs that have received and chosen to ignore the call announce message and ATs that missed the call announce message. Accordingly, it is possible that ATs wishing to participate in a multicast session may lose this opportunity if the initial call announce message is missed.

Figure 5:
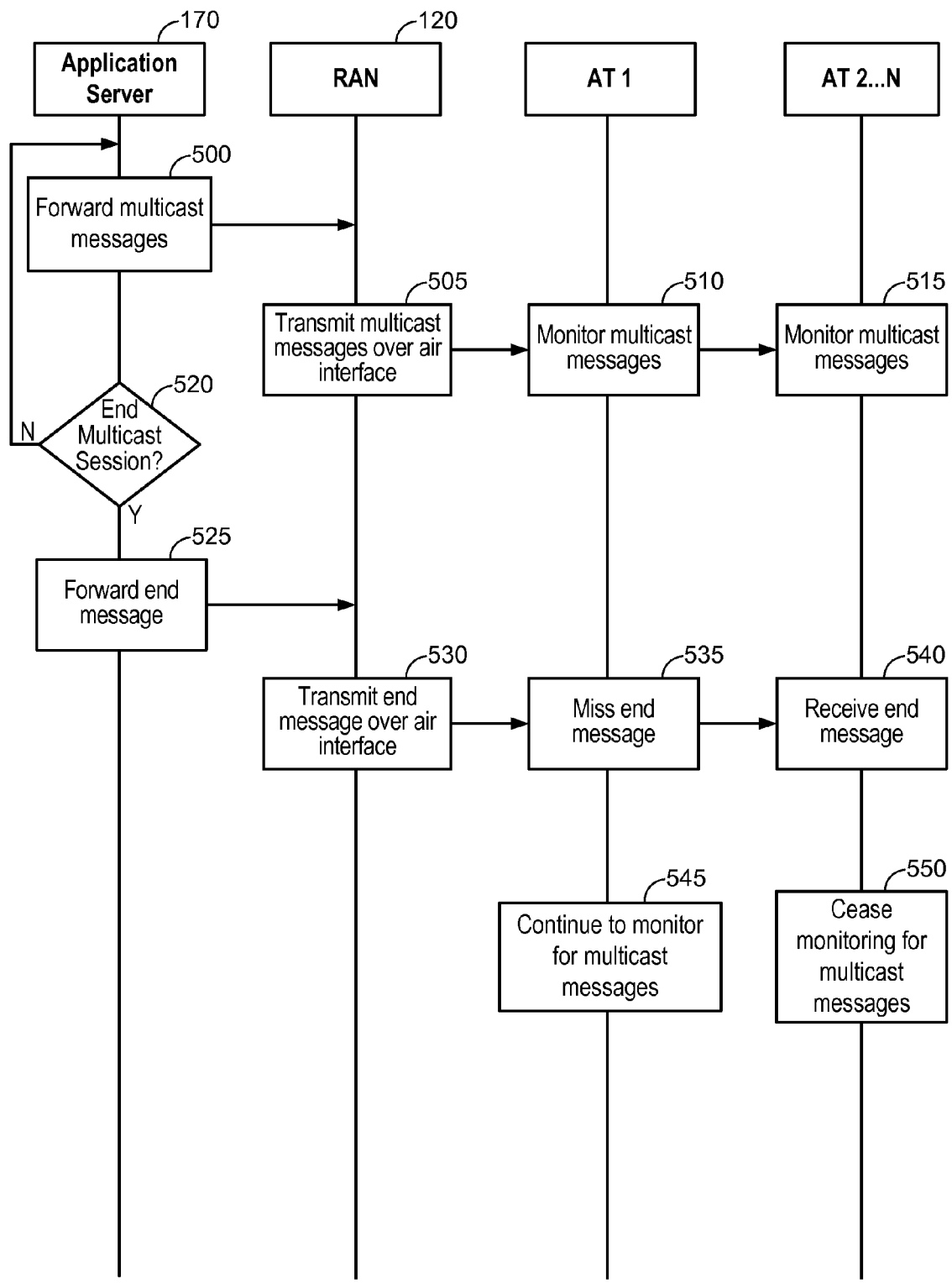
FIG. 5 illustrates a conventional multicast call termination process.

FIG. 5 illustrates a conventional multicast call termination process. Referring to FIG. 5, in 500, a multicast session is active and the application server 170 is forwarding multicast messages to the RAN 120 for transmission to ATs 1 . . . N. In FIG. 5, assume that each of ATs 1 . . . N has registered for and is actively monitoring the multicast session. In 505, the RAN 120 receives the forwarded multicast messages and transmits the multicast messages over air interface 104 to ATs 1 . . . N. The transmission of 505 may occur in a single sector, or multiple sectors, based on where ATs 1 . . . N are located. Assume that AT 1 and ATs 2 . . . N receive and decode the transmitted multicast transmissions in 510 and 515, respectively.

Referring to FIG. 5, the application server 170 determines whether to end the multicast session, 520. For example, a PTT initiator or current floor-holder may indicate a request to terminate the call. If the application server 170 determines not to end the multicast session, the process returns to 500 and the application server 170 continues to forward multicast messages associated with the multicast session to the RAN 120 for transmission to ATs 1 . . . N. Otherwise, if the application server 170 determines to end the call, the application server 170 generates an end call message and forwards the end call message to the RAN 120 for transmission to ATs 1 . . . N, 525. The RAN 120 receives the forwarded end call message and transmits the end call message to the ATs 1 . . . N, 530. For example, the RAN 120 may transmit the end call message on a next physical layer packet.

Referring to FIG. 5, assume that AT 1 misses the transmitted end call message, 535, and that ATs 2 . . . N receive and decode the transmitted end call message, 540. Accordingly, AT 1 continues to monitor for multicast messages associated with the multicast session (e.g., at least for the duration of an inactivity timer period), 545, whereas ATs 2 . . . N are aware that the multicast session has terminated and thereby cease monitoring for multicast messages, 550. In an example, AT 1 may continue monitoring for multicast messages until an inactivity that runs from a previous multicast message expires. Thus, AT 1 may reject any incoming calls because AT 1 believes it is still in a call until the inactivity timer expires. Furthermore, AT 1 may waste resources searching for multicast messages that will not arrive because AT 1 missed the end call message in 535.

FIGS. 4 and 5, described above, have been directed to very specific messages in a multicast communication, and discuss potential consequences if these messages are not properly received and decoded by target access terminals. However, the call announce or call end messages discussed above are intended for example purposes only, as many types of messages are important in multicast communications and can potentially have adverse consequences if not properly received/decoded. For example, in a multimedia multicast scenario (e.g., streaming video), a given frame can be essential in decoding other frames (e.g., an I-frame in MPEG4). Thus, if the essential frame is missed at a target access terminal, its dependent frames cannot be properly decoded.

Figure 7:
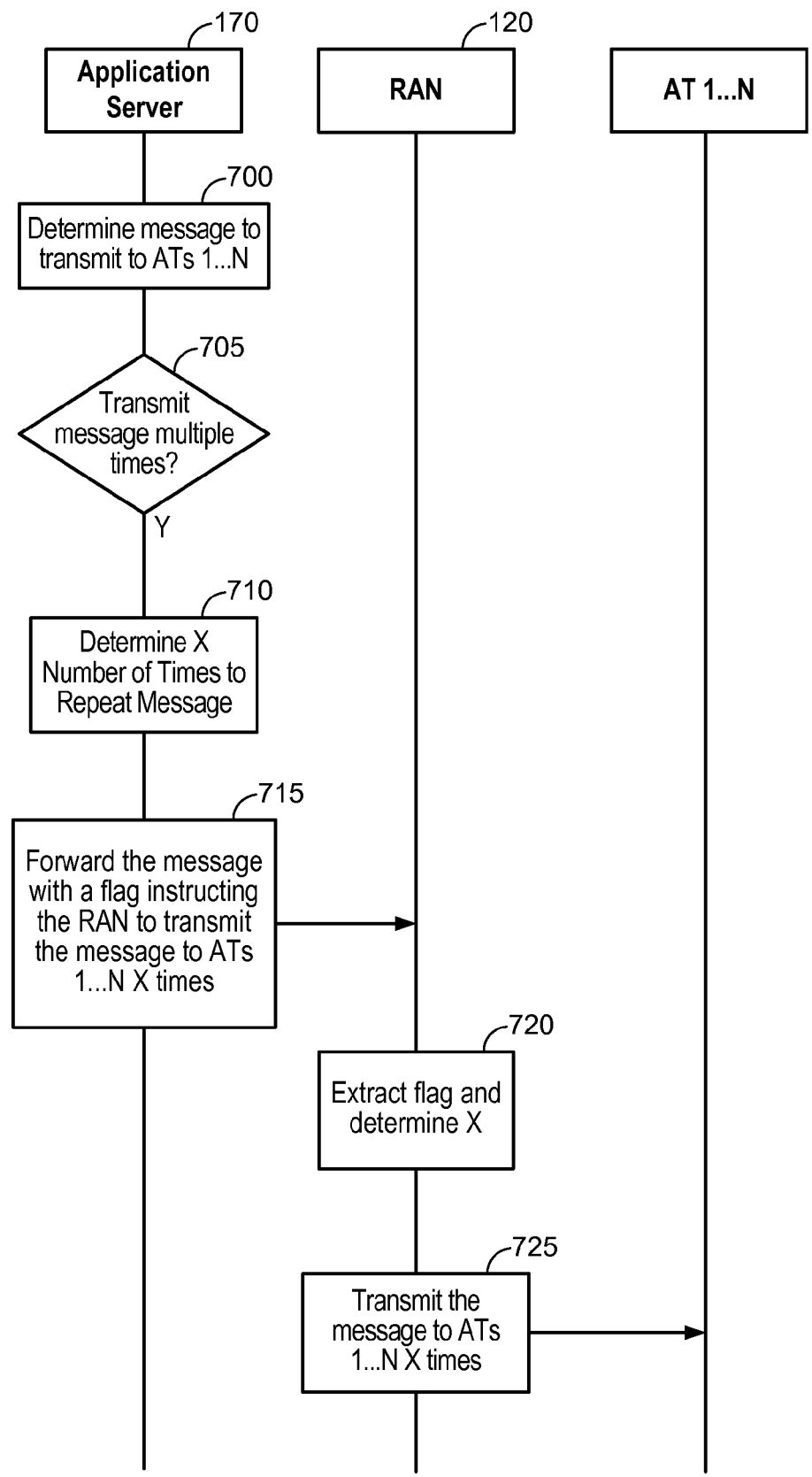
FIG. 7 illustrates a multicast message transmission process according to another embodiment of the present invention.
Figure 8:
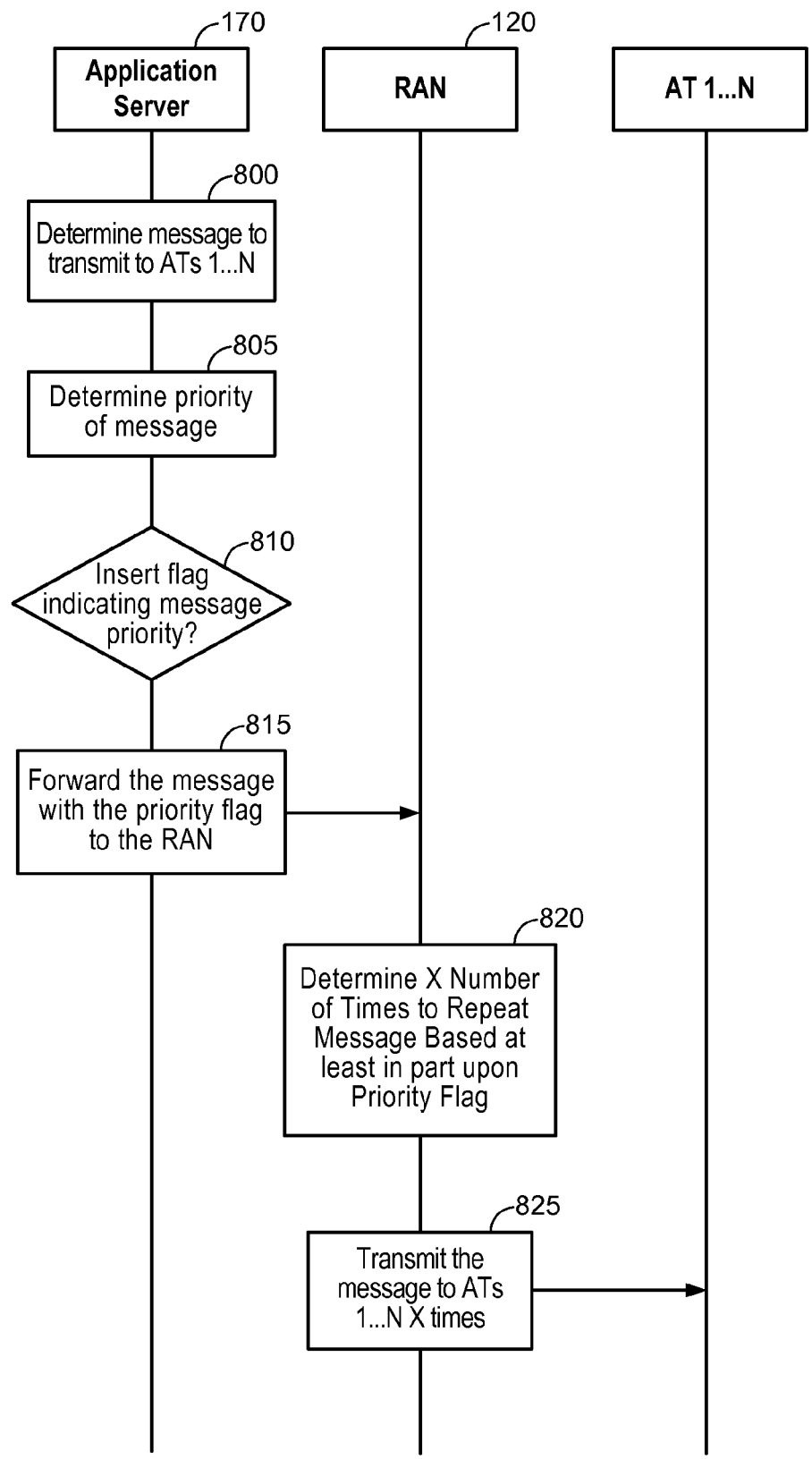
FIG. 8 illustrates a multicast message transmission process according to yet another embodiment of the present invention.

As discussed above with respect to FIGS. 4 and 5, messages (e.g., call announce messages, end call messages, etc.) can be missed, which can cause communication problems in a wireless communications system. Accordingly, embodiments of the present invention are directed to processes for repeating message transmissions for certain messages within the wireless communications system. Below, three message transmission processes according to embodiments of the present invention are described with respect to FIGS. 6, 7 and 8, respectively. Then, the processes of FIGS. 6, 7 and 8 are described within the call announce and call end multicast message scenarios, followed by a description of selective multicast repetition where messages that are already transmitted periodically (e.g., overhead messages, such as BOMs) are transmitted in a more rapid succession in response to a triggering event.

Figure 6:
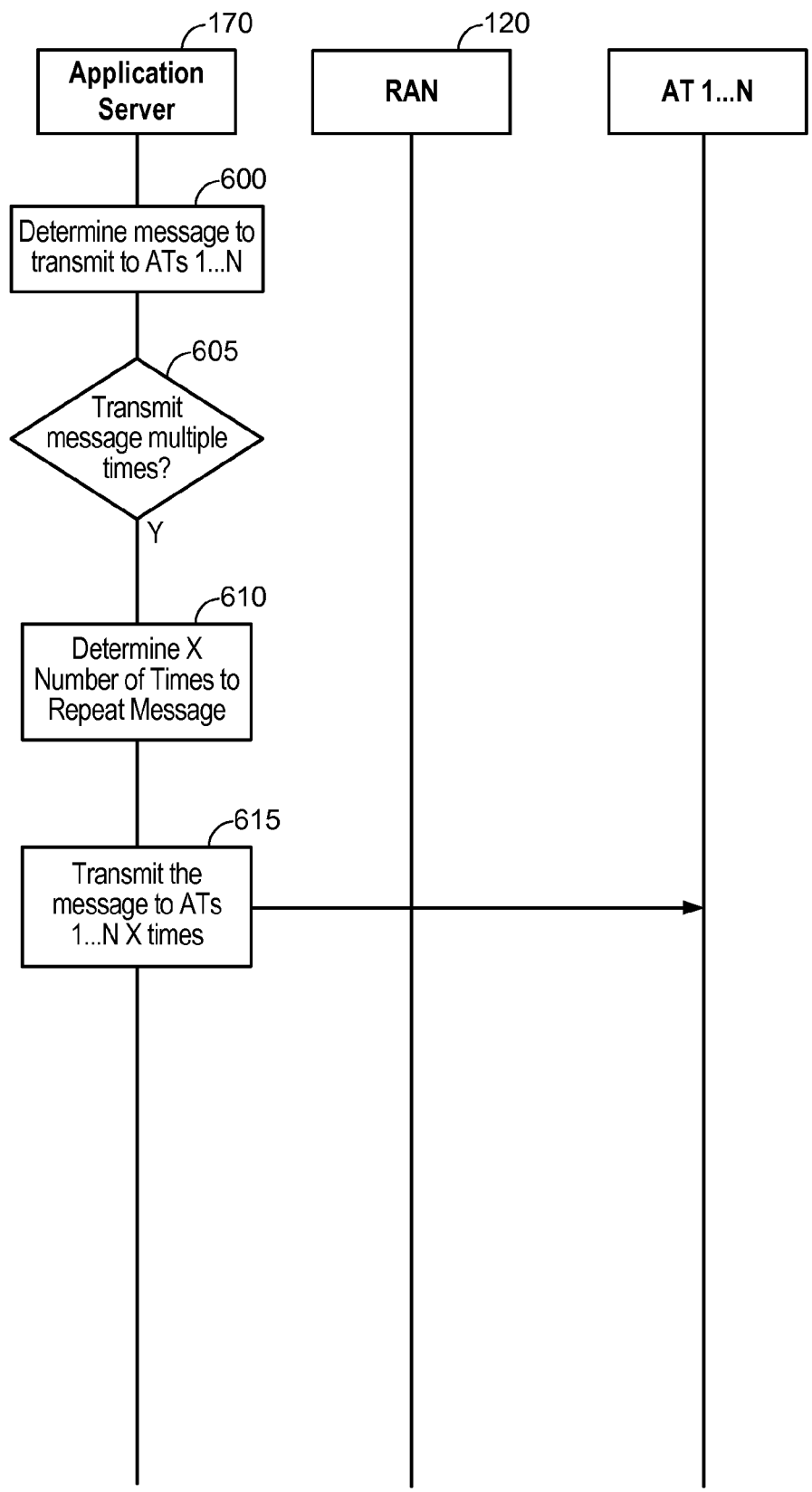
FIG. 6 illustrates a multicast message transmission process according to an embodiment of the present invention.

FIG. 6 illustrates a message transmission process according to an embodiment of the present invention. Referring to FIG. 6, in 600, the application server 170 determines a multicast message to transmit to one or more ATs 1 . . . N (e.g., where N>=1) in accordance with a given communication protocol (e.g., where prompt feedback is not necessarily expected from each AT receiving the message). For example, the given communication protocol can correspond to a multicasting protocol, or a broadcasting protocol.

Next, in 605, the application server 170 determines whether to transmit the message, determined in 600, multiple times. In an example, the application server 170 can determine to transmit the multicast message multiple times if the multicast message is determined to be relatively important. As will be appreciated by one of ordinary skill in the art, repeating all multicast messages transmitted from the application server 170 may increase the load upon the RAN 120 as well as interference within the wireless communications system. Thus, determining which multicast messages to repeat can be based upon a tradeoff between the load/interference associated with the repeated multicast messaging and the relative importance of target access terminals successfully receiving and decoding the multicast message. For example, a multicast message that may be determined to have an importance sufficient for multiple transmission in 605 can include a call announce message or end call message for a multicast session, a BOM message transmitted during an initial period of a multicast session, certain frames in a multimedia transmission (e.g., an I-frame in MPEG4, or any frame that other frames are dependent on for successful decoding, etc.), an emergency message (e.g., if a cell-phone battery is low, if a message sender has a high priority, such as a general, if a message is sent from a particular location, such as war zone, etc.) and/or any other message that the application is configured to allocate higher message priority.

While not illustrated in FIG. 6, if the application server 170 determines to transmit the multicast message a single time, the multicast message is forwarded to the RAN 120 for transmission to ATs 1 . . . N, as is known in the art. Alternatively, if the RAN 120 determines to transmit the multicast message multiple times, the process advances to 610.

Referring to FIG. 6, in 610, the application server 170 determines the number of times or repetition number, denoted as 'X', to transmit the message. For example, particular types of messages may be associated with default repetition numbers. Table 1 (below) illustrates examples of potential default repetition numbers for certain message types:

TABLE 1

Example Repetitions Based on Message Types

| Message Type | Number of Transmission Repetitions |
| --- | --- |
| Call announce message in multicast | 3 |
| End call message in multicast | 3 |
| Non-Essential Media Message | 1 |
| Essential Media Message | 2 |
| Emergency Message | 5 |

As will be appreciated by one of ordinary skill in the art, Table 1 (above) illustrates mere examples of message repetitions associated with a few example message types. With respect to the BOM example, as will be described in greater detail below, BOMs are conventionally sent periodically, at a given BOM interval, during a multicast session. In an example, Table 1 illustrates the BOM can be transmitted multiple times (e.g., 4 times) before a next BOM transmission period. This is discussed in greater detail below with respect to BOMs and other types of overhead messages that repeat. It is also possible, while not in Table 1, to have a hierarchy of priorities within one or more message types, such that the same repetition number need not be associated for all messages of the same type.

In an alternative embodiment, instead of a static table with default message repetition values, the number of transmission repetitions can be determined dynamically. For example, the number of transmission repetitions can be based upon current operating parameters. For example, if previous call announce messages have resulted in a relatively low number of registrations, then the number of repetitions associated with future call announce messages can be augmented in an attempt to increase the number of responses from the target access terminals. Thus, while the application server 170 is not typically aware of channel conditions within particular sectors, poor channel conditions may be inferred if call announce messages are relatively unsuccessful in obtaining registrations.

After determining the number of times X the message is to be transmitted in 610, the message is transmitted X separate times, from the application server 170, in 615. An example implementation of 615 of FIG. 6 is described in greater detail below with respect to FIG. 15.

As will be appreciated by one of ordinary skill in the art, increasing the number of times a particular multicast message is transmitted increases the probability that at least one version or instantiation of the multicast message will be received and decoded by one or more target ATs successfully. Also, as will be discussed below with respect to FIG. 15, the timing of each of the X multicast message forwards from the application server 170 to the RAN 120 can be controlled to reduce an occurrence of multiple message instantiations being transmitted on the same physical layer packet, which can reduce the transmission success-rate benefit gained from transmitting the same message multiple times.

FIG. 7 illustrates another message transmission process according to an embodiment of the present invention. Referring to FIG. 7, 700, 705 and 710 correspond to 600, 605 and 610, respectively, of FIG. 6. Accordingly, 700, 705 and 710 will not be discussed further for the sake of brevity. Referring to 715 of FIG. 7, instead of sending X separate transmissions of the multicast message as in 615, the application server 170 sets a flag in a header portion of the message to indicate, to the RAN 120, that the message is to be transmitted X times. For example, the flag can be a Differentiated Services Code Point (DSCP) value in the header portion of a packet or packets including the message. After setting the flag to indicate X, the multicast message is forwarded from the application server 170 to the RAN 120, 715.

Referring to FIG. 7, the RAN 120 receives the forwarded multicast message, extracts the flag and interprets the extracted flag to determine X, 720. In an example, the RAN 120 checks the headers of each message on the BCA10 connection associated with the signaling flow. In another example, if media messages are potentially repeated as well, the RAN 120 checks the headers of each message on the BCA10 connection associated with media as well. Accordingly, the RAN 120 is configured to check the headers of packets that the application server 170 may potentially flag for repetition.

After determining X, the RAN 120 transmits the multicast message X times, 725. In an example, the RAN 120 does not simply transmit each message repetition at the same time, but rather spreads the repetitions of the message transmissions apart to increase the points of failure and the probability that at least one instance of the message will be successfully decoded. For example, in certain BCMCS protocols, the RAN 120 transmits a physical layer packet associated with a BCMCS flow every 100 ms (e.g., a physical layer packet interval). In this example, for X repetitions of a particular message, the RAN 120 may transmit each multicast message instantiation on a different physical layer packet. In an example, the RAN 120 may schedule the multicast message instantiations on consecutive physical layer packets. It will be appreciated that it is more difficult to schedule the message repetitions on different physical layer packets where each message instantiation is initiated at the application server 170, as in FIG. 6. However, scheduling the message repetitions on different physical layer packet in FIG. 6 is discussed in more detail below with respect to FIG. 15.

FIG. 8 illustrates yet another multicast message transmission process according to an embodiment of the present invention. Referring to FIG. 8, in 800, the application server 170 determines a multicast message to transmit to one or more ATs 1 . . . N (e.g., where N>=1). Next, in 805, the application server 170 determines a priority of the message to be transmitted.

In an example, the application server 170 can determine to a priority to allocate to a particular message based on an associated message type. In an example, particular types of messages may be associated with default priority levels, as illustrated in Table 2 (below):

TABLE 1

Example Priority Levels of Different Message Types

| Message Type | Priority Level (1 is highest priority) |
| --- | --- |
| Call announce message in multicast | 2 (medium) |
| End call message in multicast | 2 (medium) |
| Essential Media Message | 1 (high) |
| Non-Essential Media message | 3 (low) |
| Emergency Message | 1 (high) |

As will be appreciated by one of ordinary skill in the art, Table 2 (above) illustrates mere examples of message type priority levels associated with a few example message types. It is understood that other embodiments of the invention can be directed to more than three (3) priority levels, as well as different message types.

In an alternative embodiment, instead of a static table with default message type priority values, the priority level of a message can be determined dynamically. For example, the priority level of a particular message can be based upon current operating parameters. For example, if previous call announce messages have resulted in a relatively low number of registrations, then the priority level of future call announce messages can be augmented in an attempt to increase the number of responses from the target access terminals.

After determining the priority level of the message, the application server 170 determines whether to insert a flag indicating the priority level, 810. In an example, if the message is determined to have low priority (e.g., priority level 3 in Table 2), then no flag indicating the low priority need be entered because the message need not be repeatedly transmitted. Thus, by not including a priority flag, the RAN 120 will simply interpret the low-priority message as requiring a single transmission, as is known in the art. Alternatively, if even low priority messages are associated with more than one message repetition, then the low priority can also be flagged in the message. In a further example, the application server 170 may determine to insert a flag indicating medium or high priority for the message, based upon the priority determination of 805.

For convenience of explanation, assume that the application server 170 determines to insert a flag into the message in 810. Accordingly, in 815, the application server 170 inserts the flag (e.g., a DSCP value indicating the priority) into the message and forwards the flagged message to the RAN 120. The RAN 120 receives the forwarded message, extracts the flag and determines the number of times X to transmit the message based at least in part upon the priority indicated by the flag, 820. In an example, the RAN 120 checks the headers of each message on the BCA10 connection associated with the signaling flow. In another example, if media messages are potentially repeated as well, the RAN 120 checks the headers of each message on the BCA10 connection associated with media as well. Accordingly, the RAN 120 is configured to check the headers of packets that the application server 170 may potentially flag for priority.

In an example, the RAN 120 can maintain default X values that are associated with each priority value the flag may indicate. In this example, the RAN 120, in 820, simply loads a priority table, sets X equal to the value associated with the flagged priority. In another example, the value associated with the flagged priority in the priority table can be a base value $X_B$ that can be scaled to compute an actual repetition value $X_A$ by the RAN 120 based on operational conditions.

For example, the base value $X_B$ may be scaled on a per-sector basis, such that sector-specific conditions can be taken into account. For example, if a given sector is notorious for dropped packets due to poor channel conditions, the sector may be allocated a positive repetition offset to be applied to $X_B$ to calculate $X_A$. For example, assume that the flag indicates priority 2, and that the RAN 120 checks the priority table and determines $X_B=3$ for priority 2. Next, assume that the message is to be transmitted in 3 sectors in order to reach ATs 1 . . . N, with a first sector having good channel conditions, a second sector having poor channel conditions and a third sector having average channel conditions. The first sector having good channel conditions is allocated a negative repetition offset of (−1), the second sector having poor channel conditions is allocated a positive repetition offset of (+1) and the third sector having average channel conditions is allocated a neutral repetition offset of (0). Thus, $X_A=2$ for the first sector, $X_A=4$ for the second sector and $X_A=3$ for the third sector. As will be appreciated by one of ordinary skill in the art, the above example lists one possible way that channel conditions can be taken into account by the RAN 120.

After determining X (or $X_A$) in 820, the RAN 120 transmits the message X times, 825. As will be appreciated, the RAN 120 may determine a different value for X in different sectors (e.g., $X_A$), as discussed above. In an example, the RAN 120 does not simply transmit each message repetition at the same time, but rather spreads the repetitions of the message transmissions apart to increase the points of failure and the probability that the message will be successfully decoded. For example, in certain BCMCS protocols, the RAN 120 transmits a physical layer packet associated with a BCMCS flow every 100 ms (e.g., a physical layer packet interval). In this example, for X repetitions of a particular message, the RAN 120 may transmit each message instantiation on a different physical layer packet. In an example, the RAN 120 may schedule the message instantiations on consecutive physical layer packets.

Below, examples of the processes of FIGS. 6, 7 and 8 are described with respect to a call announce message in FIGS. 9, 10 and 11, respectively, followed by examples of the processes of FIGS. 12, 13 and 14 described with respect to an end call message in FIGS. 12, 13 and 14, respectively.

Figure 9:
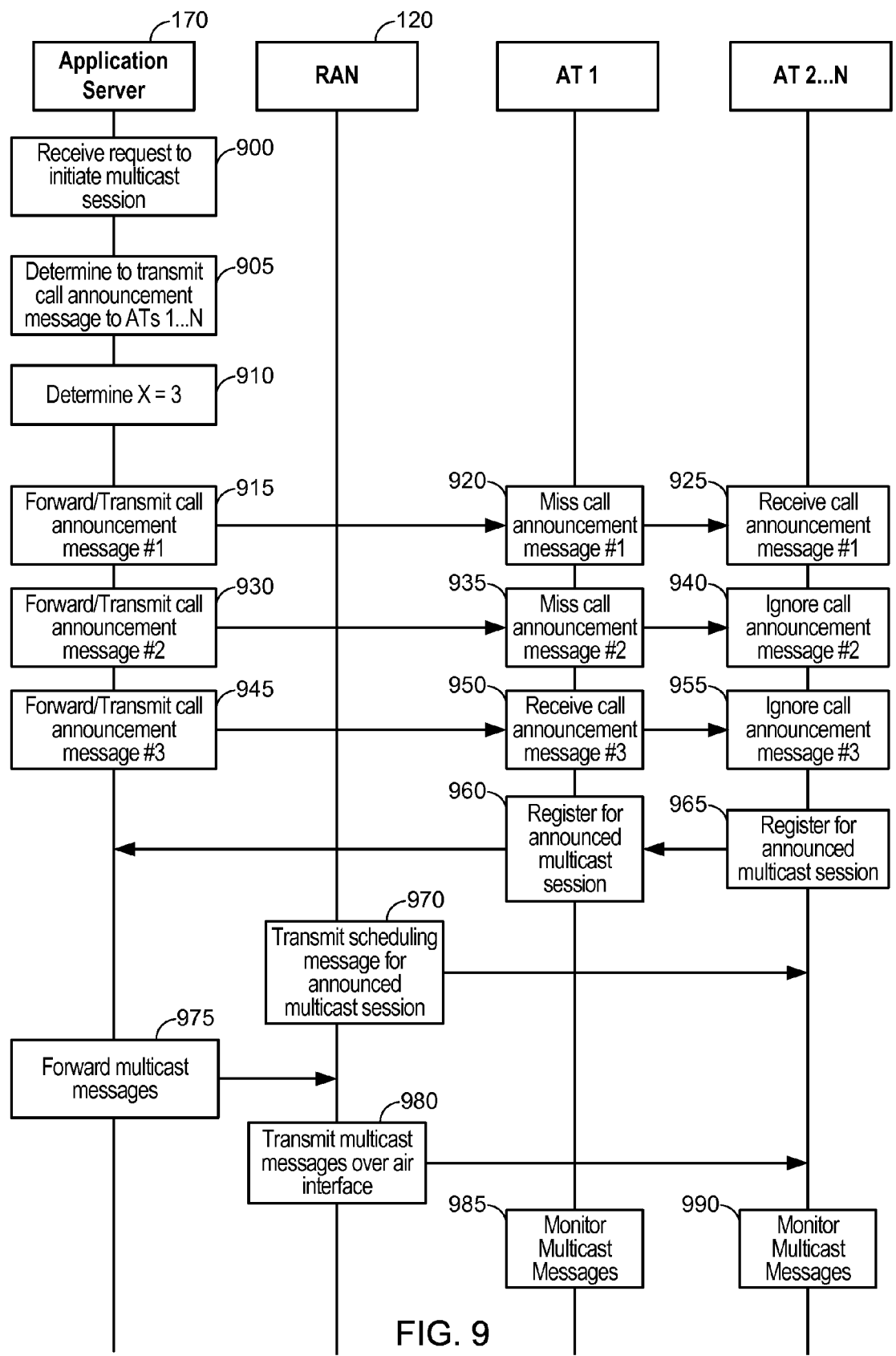
FIG. 9 illustrates a multicast call setup process in accordance with an embodiment of the present invention and performed based on the message transmission process of FIG. 6.

FIG. 9 illustrates a multicast call setup process in accordance with an embodiment of the present invention and performed based on the message transmission process of FIG. 6. Referring to FIG. 9, the application server 170 receives a request to initiate a multicast session, 900. In 905, the application server 170 determines to transmit a call announce message to one or more multicast group members denoted as ATs 1 . . . N (e.g., wherein N>=1). 905 of FIG. 9 may correspond to 600 of FIG. 6, in an example. Next, the application server 170 determines to transmit the call announce message three (3) times, 910. In an example, 910 of FIG. 9 may correspond to 605 and 610 of FIG. 6, where the application server 170 determines to transmit the call announce message multiple times and then determines X=3, for example, based on a repetition table maintained at the application server 170.

In 915, the application server 170 forwards a first call announce message to the RAN 120, and the RAN 120 transmits the first call announce message in a plurality of sectors of the wireless communication system 100. For example, the RAN 120 may transmit the first call announce message on a next physical layer packet. Next, assume that AT 1 misses the first call announce message, 920, and that ATs 2 . . . N receive and decode the first call announce message, 925. In 930, the application server 170 forwards a second call announce message to the RAN 120, and the RAN 120 transmits the call announce message in a plurality of sectors of the wireless communication system 100. Assume that AT 1 misses the second call announce message, 935, and that ATs 2 . . . N ignore the second call announce message (e.g., because ATs 2 . . . N already received and decoded the first call announce message), 940. In 945, the application server 170 forwards a third call announce message to the RAN 120, and the RAN 120 transmits the third call announce message in a plurality of sectors of the wireless communication system 100. Assume that AT 1 receives the third call announce message, 950, and that ATs 2 . . . N again ignore the call announce message, 955. 915 through 955 of FIG. 9 generally correspond to 615 of FIG. 6.

Accordingly, because each of ATs 1 . . . N have now received the call announce message, ATs 1 . . . N register for the multicast session by sending the Accept Call and registration messages to the application server 170 and the RAN 120 (e.g., a BCMCSFlowRegistration message), 960, 965, respectively. The RAN 120 transmits a scheduling message (e.g., a broadcast overhead message (BOM)) for the announced multicast session, 970, that advertises a flow ID for the multicast session and includes instructions with regard to how access terminals can tune to the multicast session. Next, the application server 170, after receiving a first registration, begins to forward multicast messages to the RAN 120 for transmission, 975, the RAN 120 transmits the multicast messages at least within sectors including one or more ATs that have registered for the multicast session, 980. Next, ATs 1 . . . N monitor the multicast messages (e.g., on the BCH) in accordance with the scheduling message, 985, 990. As will be appreciated by one of ordinary skill in the art, because ATs 1 . . . N each receive at least one of the three transmitted call announce messages, each of ATs 1 . . . N has the option of participating in the announced multicast session.

Figure 10:
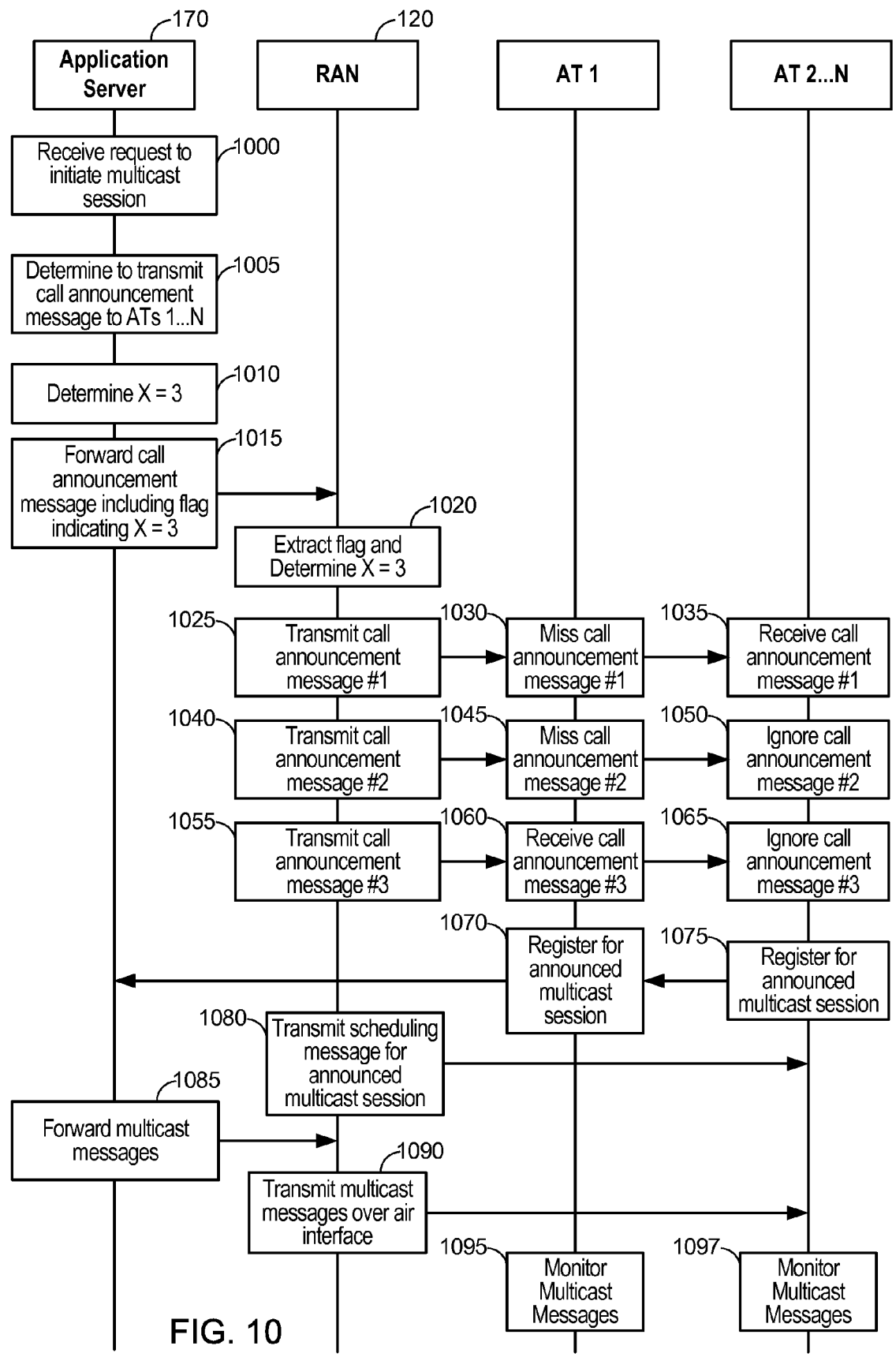
FIG. 10 illustrates a multicast call setup process in accordance with an embodiment of the present invention and performed based on the message transmission process of FIG. 7.

FIG. 10 illustrates a multicast call setup process in accordance with an embodiment of the present invention and performed based on the message transmission process of FIG. 7. Referring to FIG. 10, the application server 170 receives a request to initiate a multicast session, 1000. In 1005, the application server 170 determines to transmit a call announce message to one or more multicast group members denoted as ATs 1 . . . N (e.g., wherein N >=1). 1005 of FIG. 10 may correspond to 700 of FIG. 7, in an example. Next, the application server 170 determines to transmit the call announce message three (3) times, 1010. In an example, 1010 of FIG. 10 may correspond to 705 and 710 of FIG. 7, where the application server 170 determines to transmit the call announce message multiple times and then determines X=3, for example, based on a repetition table maintained at the application server 170.

In 1015, the application server 170 forwards a call announce message to the RAN 120 including a flag (e.g., a DSCP value) indicating X=3 (e.g., as in 715 of FIG. 7). The RAN 120 extracts the flag from the call announce message and interprets the extracted flag as indicating X=3, 1020 (e.g., as in 720 of FIG. 7). Accordingly, in 1025, the RAN 120 transmits a first call announce message in a plurality of sectors of the wireless communication system 100, AT 1 misses the first call announce message, 1030, and ATs 2 . . . N receive and decode the first call announce message, 1035. In 1040, the RAN 120 transmits a second call announce message, AT 1 misses the second call announce message, 1045, and ATs 2 . . . N ignore the second call announce message, 1050. In 1055, the RAN 120 transmits a third call announce message, AT 1 receives the third call announce message, 1060, and ATs 2 . . . N again ignore the call announce message, 1065. 1025 through 1065 of FIG. 10 generally correspond to 725 of FIG. 7.

Next, 1070 through 1097 of FIG. 10 generally correspond to 960 through 990 of FIG. 9, and as such a further description of these steps has been omitted for the sake of brevity. As will be appreciated by one of ordinary skill in the art, because ATs 1 . . . N each receive at least one of the three transmitted call announce messages, each of ATs 1 . . . N has the option of participating in the announced multicast session.

Figure 11:
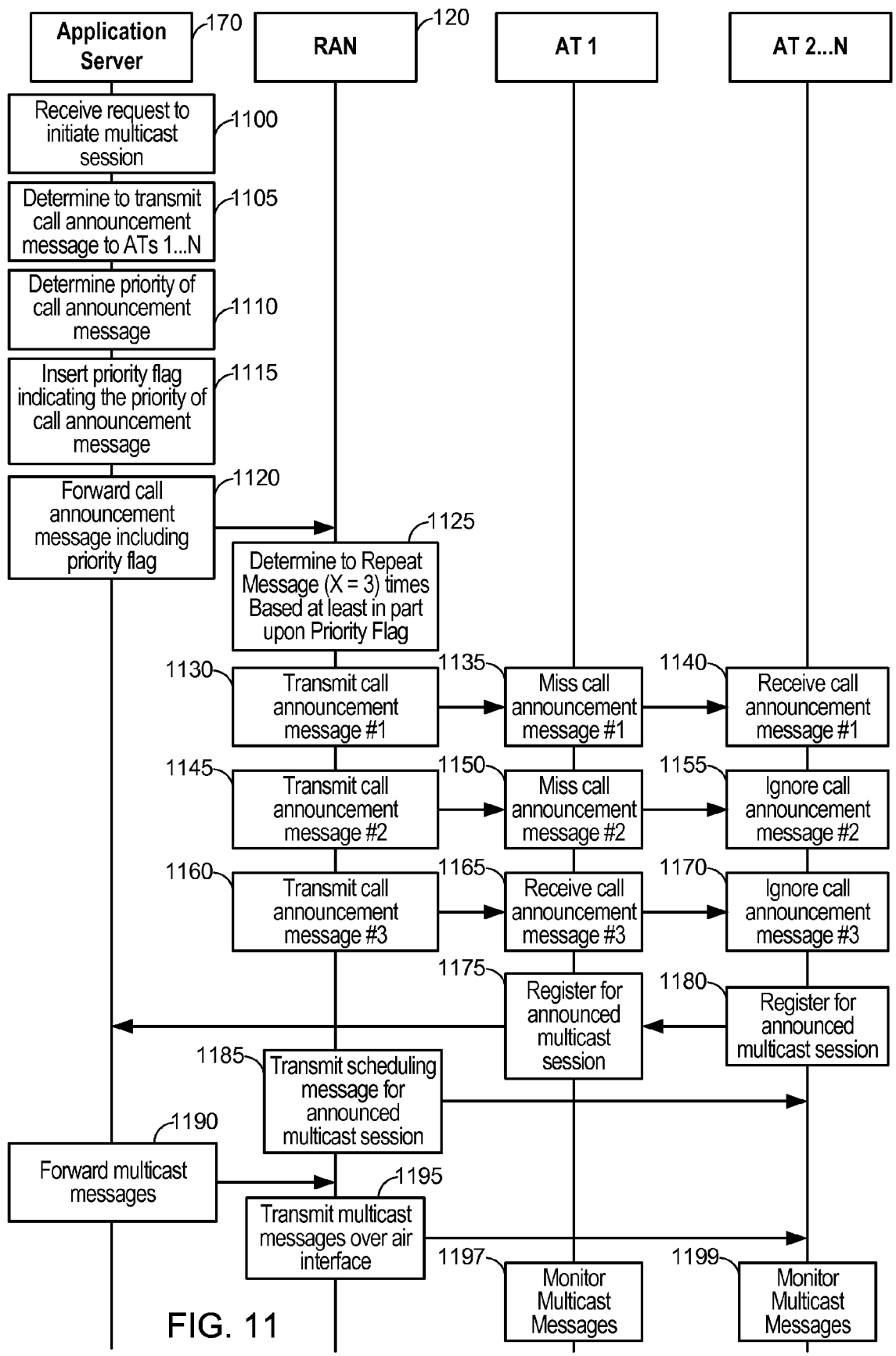
FIG. 11 illustrates a multicast call setup process in accordance with an embodiment of the present invention and performed based on the message transmission process of FIG. 8.

FIG. 11 illustrates a multicast call setup process in accordance with an embodiment of the present invention and performed based on the message transmission process of FIG. 8. Referring to FIG. 11, the application server 170 receives a request to initiate a multicast session, 1100. In 1105, the application server 170 determines to transmit a call announce message to one or more multicast group members denoted as ATs 1 . . . N (e.g., wherein N>=1). Next, the application server 170 determines a priority level of the call announce message (e.g., based on a message priority table maintained at the application server 170), 1110, and inserts a flag indicating the priority of the call announce message, 1115. In an example, 1105, 1110 and 1115 of FIG. 11 may correspond to 800, 805 and 810 of FIG. 8, respectively.

In 1120, the application server 170 forwards the call announce message including the priority flag (e.g., a DSCP value) to the RAN 120 indicating the priority of the call announce message (e.g., as in 815 of FIG. 8). The RAN 120 extracts the flag from the call announce message and determines the number of repetitions X for the call announce message, 1125 (e.g., as in 820 of FIG. 8). In an example, X may have different values in different sectors based on local or sector-specific channel conditions, as discussed above with respect to 820 of FIG. 8. In this example, assume that X=3 for each sector for the sake of convenience. Accordingly, in 1130, the RAN 120 transmits a first call announce message in a plurality of sectors of the wireless communication system 100, AT 1 misses the first call announce message, 1135, and ATs 2 . . . N receive and decode the first call announce message, 1140. In 1145, the RAN 120 transmits a second call announce message, AT 1 misses the second call announce message, 1150, and ATs 2 . . . N ignore the second call announce message, 1155. In 1160, the RAN 120 transmits a third call announce message, AT 1 receives the third call announce message, 1165, and ATs 2 . . . N again ignore the call announce message, 1170. 1130 through 1170 of FIG. 11 generally correspond to 825 of FIG. 8.

Next, 1175 through 1199 of FIG. 11 generally correspond to 960 through 990 of FIG. 9, and as such a further description of these steps has been omitted for the sake of brevity. As will be appreciated by one of ordinary skill in the art, because ATs 1 . . . N each receive at least one of the three transmitted call announce messages, each of ATs 1 . . . N has the option of participating in the announced multicast session.

Figure 12:
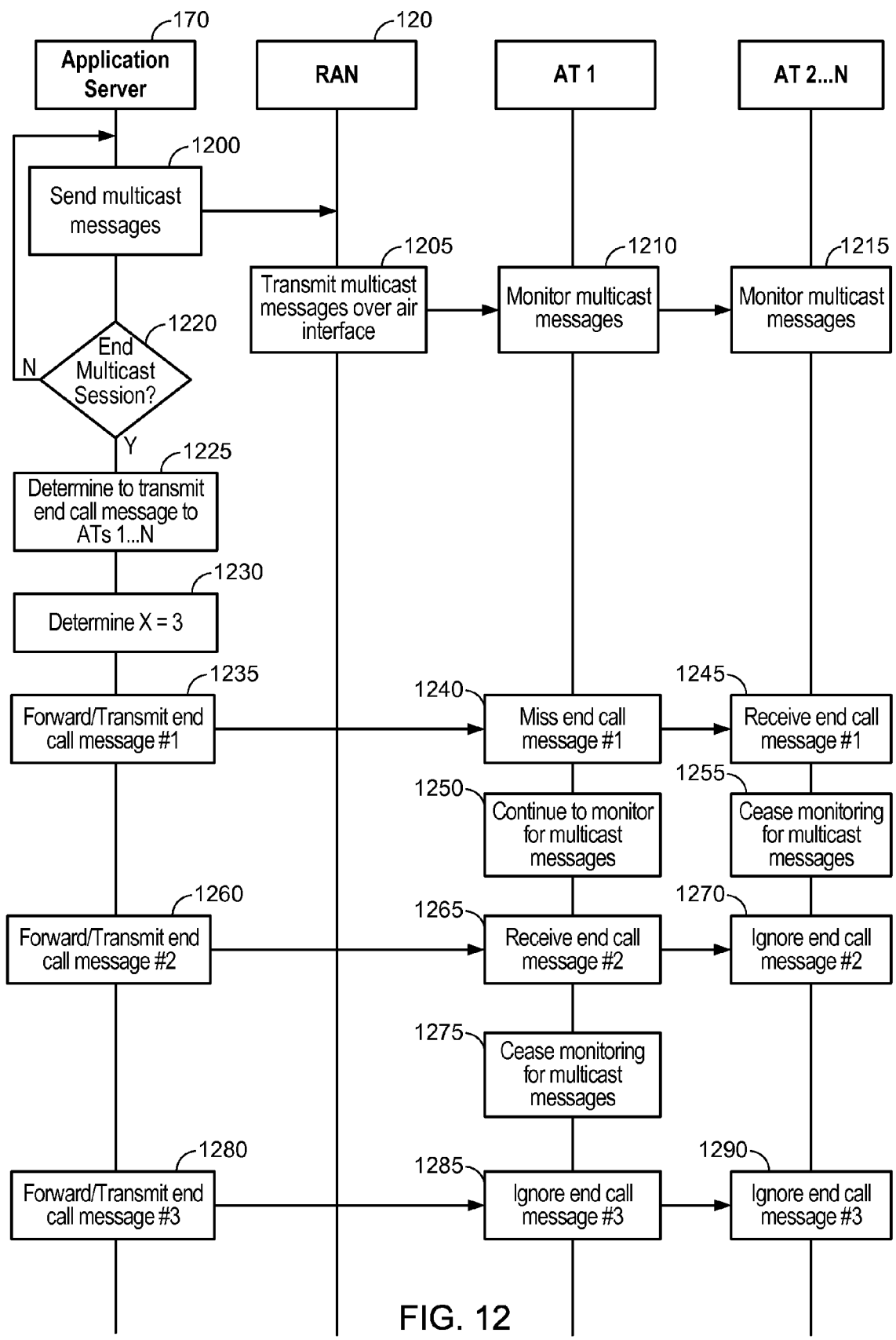
FIG. 12 illustrates a multicast call termination process in accordance with an embodiment of the present invention and performed based on the message transmission process of FIG. 6.

FIG. 12 illustrates a multicast call termination process in accordance with an embodiment of the present invention and performed based on the message transmission process of FIG. 6. Referring to FIG. 12, 1200 through 1220 generally correspond to 400 through 420 of FIG. 4, respectively, and will not be discussed further for the sake of brevity. Next, in 1225, the application server 170 determines to transmit an end call message to ATs 1 . . . N to terminate the multicast session (e.g., as in 600 of FIG. 6), and determines the number of repetitions X of the end call message transmission to be three (3), 1230 (e.g., as in 605 and 610 of FIG. 6). For example, the application server 170 may determine X=3 based on a message repetition table maintained at the application server 170.

Referring to FIG. 12, the application server 170 forwards a first end call message to the RAN 120, which transmits the first end call message to ATs 1 . . . N, 1235, AT 1 misses the transmitted end call message, 1240, and ATs 2 . . . N receive and decode the transmitted end call message, 1245. Accordingly, AT 1 continues to monitor for multicast messages associated with the multicast session, 1250, whereas ATs 2 . . . N are aware that the multicast session has terminated and thereby cease monitoring for multicast messages, 1255. Next, the application server 170 forwards a second end call message to the RAN 120, which transmits the second end call message to ATs 1 . . . N, 1260, and AT 1 receives and decodes the transmitted end call message, 1265, and ATs 2 . . . N ignore the transmitted end call message (e.g., because ATs 2 . . . N have already stopped monitoring the multicast session), 1270. Accordingly, AT 1 ceases to monitor for multicast messages associated with the multicast session, 1275. In 1280, the application server 170 forwards a third end call message to the RAN 120, which transmits the third end call message to ATs 1 . . . N, 1280. Because each of ATs 1 . . . N has already received an earlier end call message, ATs 1 . . . N ignore the transmitted end call message, 1285, 1290. As will be appreciated by one of ordinary skill in the art, unlike FIG. 5, because the end call message is transmitted multiple times, AT 1 ceases to monitor the multicast session (e.g., before an expiration of an inactivity timer) even though AT 1 missed an initial end call message in 1240.

Figure 13:
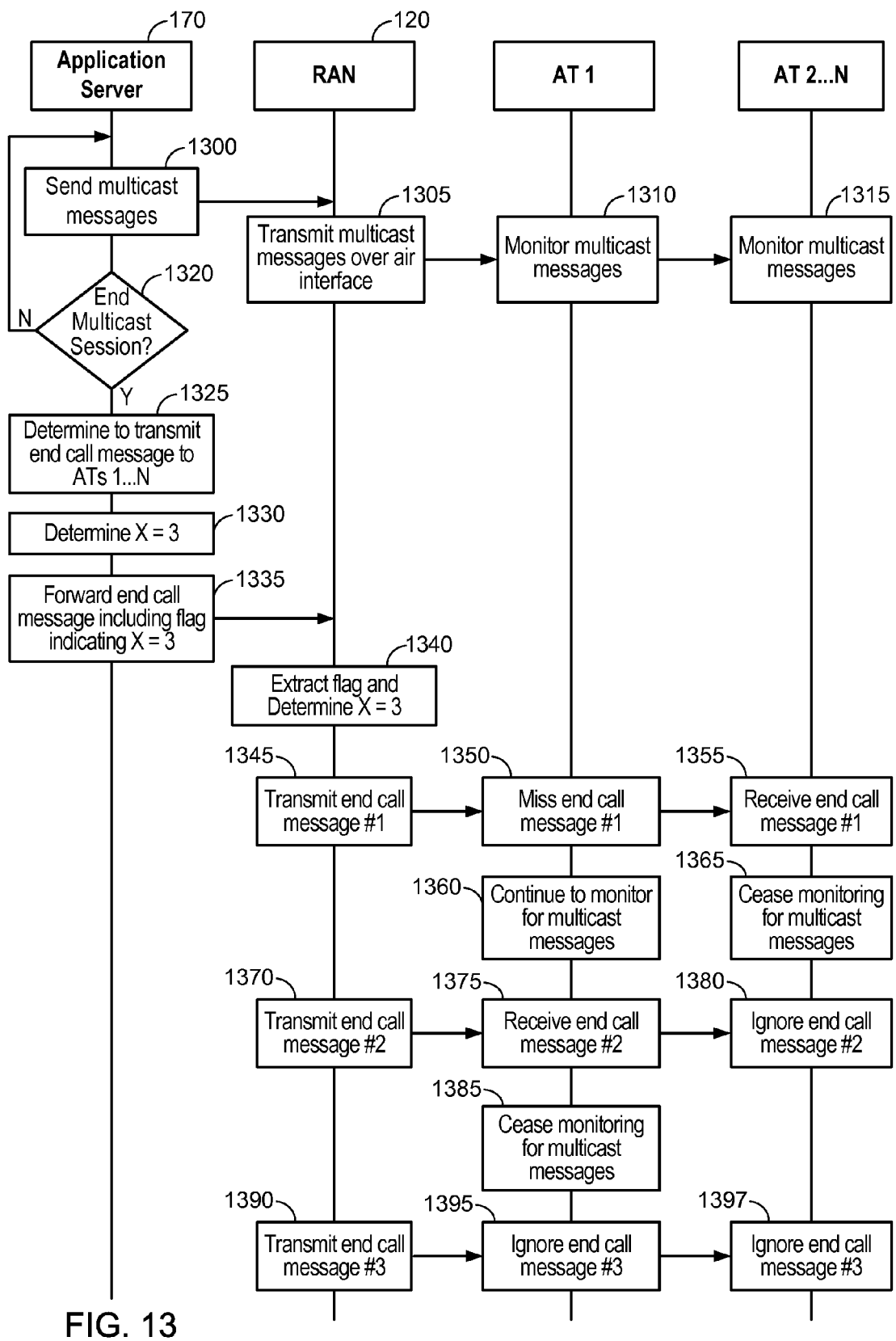
FIG. 13 illustrates a multicast call termination process in accordance with an embodiment of the present invention and performed based on the message transmission process of FIG. 7.

FIG. 13 illustrates a multicast call termination process in accordance with an embodiment of the present invention and performed based on the message transmission process of FIG. 7. Referring to FIG. 13, 1300 through 1320 generally correspond to 400 through 420 of FIG. 4, respectively, and will not be discussed further for the sake of brevity. Next, in 1325, the application server 170 determines to transmit an end call message to ATs 1 . . . N to terminate the multicast session (e.g., as in 700 of FIG. 7), and determines the number of repetitions X of the end call message transmission to be three (3), 1330 (e.g., as in 705 and 710 of FIG. 7). For example, the application server 170 may determine X=3 based on a message repetition table maintained at the application server 170.

In 1335, the application server 170 forwards an end call message to the RAN 120 including a flag (e.g., a DSCP value) indicating X=3 (e.g., as in 715 of FIG. 7). The RAN 120 extracts the flag from the end call message and interprets the extracted flag as indicating X=3, 1340 (e.g., as in 720 of FIG. 7). Accordingly, in 1345, the RAN 120 transmits a first end call message in a plurality of sectors of the wireless communication system 100, AT 1 misses the first end call message, 1350, and ATs 2 . . . N receive and decode the first end call message, 1355. Accordingly, AT 1 continues to monitor for multicast messages associated with the multicast session, 1360, whereas ATs 2 . . . N are aware that the multicast session has terminated and thereby cease monitoring for multicast messages, 1365. Next, the RAN 120 transmits a second end call message to ATs 1 . . . N, 1370, AT 1 receives and decodes the transmitted end call message, 1375, and ATs 2 . . . N ignore the transmitted end call message (e.g., because ATs 2 . . . N have already stopped monitoring the multicast session), 1380. Accordingly, AT 1 ceases to monitor for multicast messages associated with the multicast session, 1385. In 1390, the RAN 120 transmits a third end call message to ATs 1 . . . N, 1390. Because each of ATs 1 . . . N has already received an earlier end call message, ATs 1 . . . N ignore the transmitted end call message, 1395, 1397. As will be appreciated by one of ordinary skill in the art, unlike FIG. 5, because the end call message is transmitted multiple times, AT 1 ceases to monitor the multicast session (e.g., before an expiration of an inactivity timer) even though AT 1 missed an initial end call message in 1350.

Figure 14:
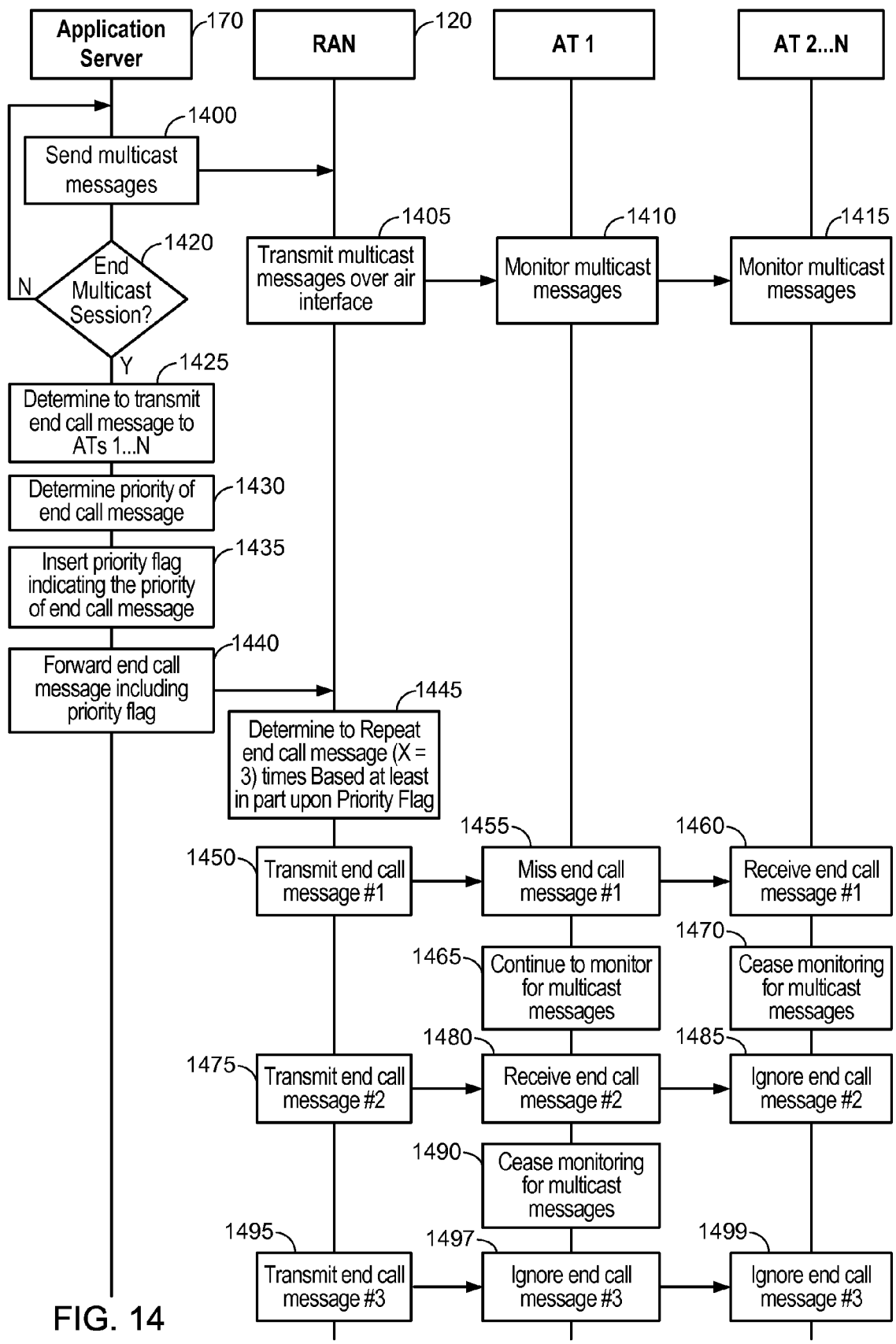
FIG. 14 illustrates a multicast call termination process in accordance with an embodiment of the present invention and performed based on the message transmission process of FIG. 8.

FIG. 14 illustrates a multicast call termination process in accordance with an embodiment of the present invention and performed based on the message transmission process of FIG. 8. Referring to FIG. 14, 1400 through 1420 generally correspond to 400 through 420 of FIG. 4, respectively, and will not be discussed further for the sake of brevity. Next, in 1425, the application server 170 determines to transmit an end call message to ATs 1 . . . N to terminate the multicast session (e.g., as in 800 of FIG. 8), and the application server 170 determines a priority level of the end call message (e.g., based on a message priority table maintained at the application server 170), 1430, and inserts a flag indicating the priority of the end call message, 1435. In an example, 1425, 1430 and 1435 of FIG. 14 may correspond to 800, 805 and 810 of FIG. 8, respectively.

In 1440, the application server 170 forwards the end call message including the priority flag (e.g., a DSCP value) to the RAN 120 indicating the priority of the end call message (e.g., as in 815 of FIG. 8). The RAN 120 extracts the flag from the end call message and determines the number of repetitions X for the end call message, 1445 (e.g., as in 820 of FIG. 8). In an example, X may have different values in different channels based on local or sector-specific channel conditions, as discussed above with respect to 820 of FIG. 8. In this example, assume that X=3 for each sector for the sake of convenience. Referring to FIG. 14, 1450 through 1499 correspond to 1345 through 1397 of FIG. 13, and as such will not be described further for the sake of brevity.

As will be appreciated by one of ordinary skill in the art, call announce messages and call end messages originate at the application server 170, which forwards the call announce or call end messages to the RAN 120 for transmission. During the multicast session, however, the RAN 120 also generates and transmits certain messages without explicit instructions from the application server 170. These overhead messages, such as Broadcast Overhead Messages (BOMs), can be repeated throughout the multicast session. For example, with respect to BOMs, BOMs conventionally repeat during the multicast session at a given BOM period (e.g., every three seconds).

The BOM period, or repetition period, in this case is controlled by the RAN 120. At certain times during a multicast session, it may be more important to receive BOMs correctly than at other times. For example, at the beginning of the call following the announce message, many new multicast group members wait for the BOM for instructions regarding how to decode multicast messages on the downlink BCH. If one or more ATs miss the initial BOM, those ATs cannot tune to the downlink BCH on the correct interlace-multiplex (IM)-pair, such that the ATs must wait for a next BOM before participating in the multicast session. Because the BOM period is relatively long, this can reduce the effectiveness of the multicast session.

Accordingly, in an embodiment of the invention, overhead messages, such as BOMs, that already are scheduled for repetition, can be sent more rapidly in response to one or more triggering events. As mentioned above, one potential triggering event that may trigger a more rapid repetition of overhead messages (e.g., BOMs) can be the beginning of the multicast call. Another example triggering event can be a determination that relatively few ATs that have registered for the multicast session have tuned to the downlink BCH.

Figure 15:
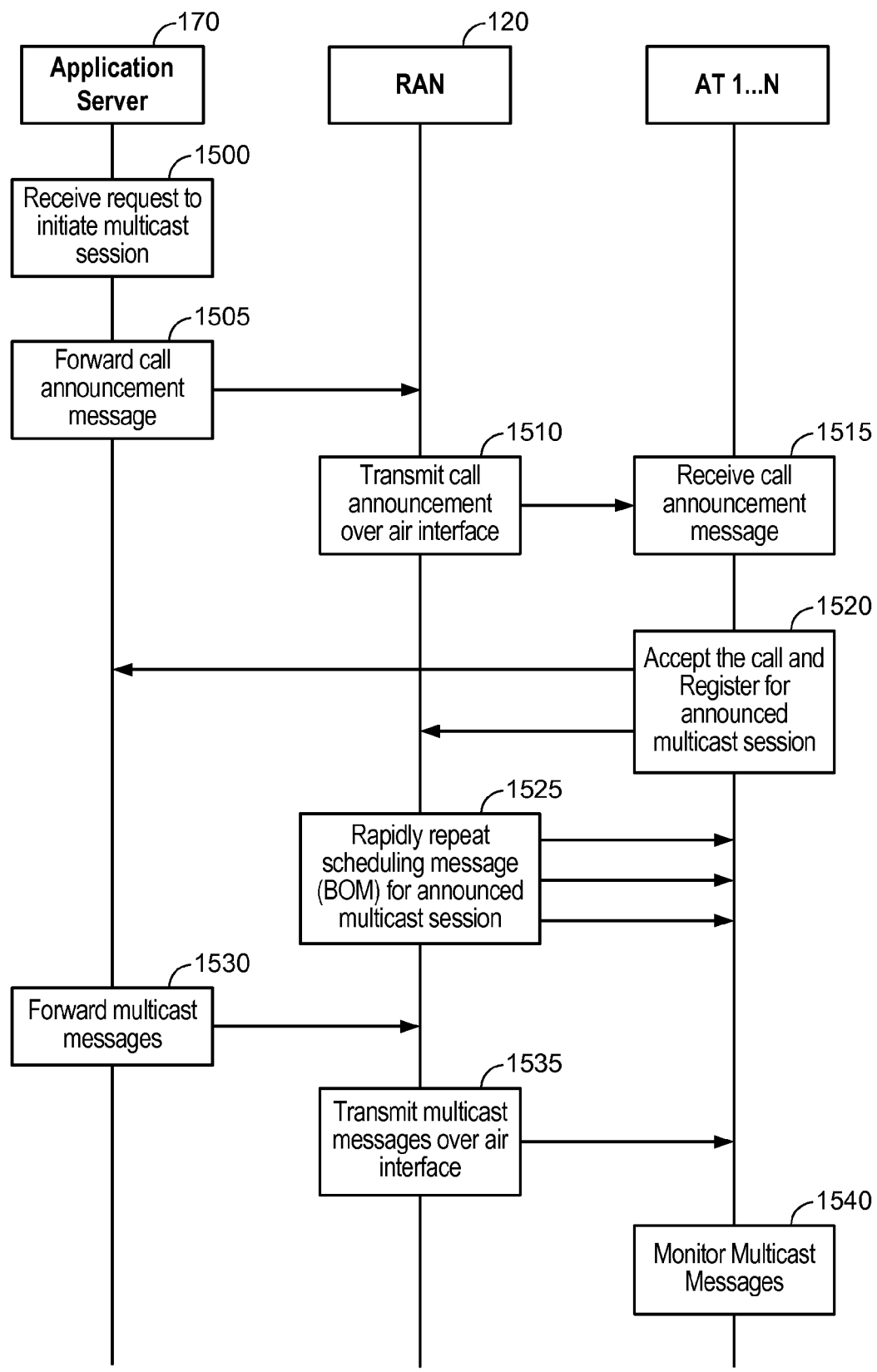
FIG. 15 illustrates a broadcast overhead message (BOM) transmission process in accordance with an embodiment of the present invention and performed based on the message transmission process of FIG. 7.

FIG. 15 illustrates a BOM transmission process in accordance with an embodiment of the present invention FIG. 7. Referring to FIG. 15, the application server 170 (e.g., a push-to-talk (PTT) or broadcast multicast service (BCMCS) server) receives a request to initiate a multicast session, 1500 (e.g., from a PTT initiator). The application server 170 generates a call announcement message for announcing the multicast session to one or more multicast group members denoted as ATs 1 . . . N (e.g., wherein N>=1), and forwards the call announce message to the RAN 120, 1505. The RAN 120 receives the call announce message and transmits the call announce message in a plurality of sectors of the wireless communication system 100, 1510. For example, the RAN 120 may transmit the call announce message on a next physical layer packet. Next, ATs 1 . . . N receive the call announcement message, 1515, and accept the call by sending a call accept message to the application server 170. At the same time, ATs 1 . . . N register for the multicast session by sending a registration message to the RAN 120 (e.g., a BCMCSFlowRegistration message), 1520. When the RAN 120 receives the first registration message, it learns that the multicast call is beginning and rapidly repeats the scheduling message (e.g., by transmitting a BOM on successive physical layer packets instead of once per BOM period), 1525.

Next, the application server 170, after receiving a first Accept Call message (or announce ACK message), begins to forward multicast messages to the RAN 120 for transmission, 1530. The RAN 120 receives the forwarded multicast messages and transmits the multicast messages at least within sectors including one or more ATs that have registered for the multicast session, 1535. ATs 1 . . . N monitor the multicast messages (e.g., on the BCH) in accordance with the scheduling message, 1540.

While embodiments of the present invention described above with respect to FIGS. 6 through 15 discuss different manners by which a message can be repeatedly transmitted within a wireless communications system, the scheduling of repetitive messages can affect their transmission success rate. For example, if the RAN 120 packages a plurality of message repetitions within a single physical layer packet, and a target AT misses the physical layer packet, then the message repetitions do not necessarily help to increase the transmission success rate of the message to that access terminal. Examples will now be provided wherein the message repetitions can be spread out among different (e.g., consecutive) physical layer packets to decrease the single point-of-failure scenario described above.

With respect to FIGS. 7 and 8, an initial message is forwarded from the application server 170, but the message repetitions are scheduled by the RAN 120 based on a flag included therein. Thus, it can be said that the transmission of the repetitions is scheduled, or originates from, the RAN 120 in these examples. As such, steps 725 and 825 of FIGS. 7 and 8, respectively, can include an additional scheduling aspect wherein each message repetition is scheduled on a different physical layer packet. For example, the transmission of 725 and 825 can include transmitting the message on X consecutive physical layer packets.

With respect to FIG. 6, the transmission of each message repetition at 615 originates, or is scheduled, at the application server 170. Conventionally, it is difficult for the application server 170 to ensure that different messages are scheduled on the same physical layer packet because this type of scheduling typically occurs at the RAN 120. For example, during intervals between physical layer packet transmissions, the RAN 120 can collect packets for physical layer transmission and transmit them on a next physical layer packet. Thus, if the application server 170 sends the message repetitions too quickly (i.e., between successive physical layer packet intervals), the RAN 120 may potentially transmit each of the message repetitions on the same physical layer packet.

Figure 16:
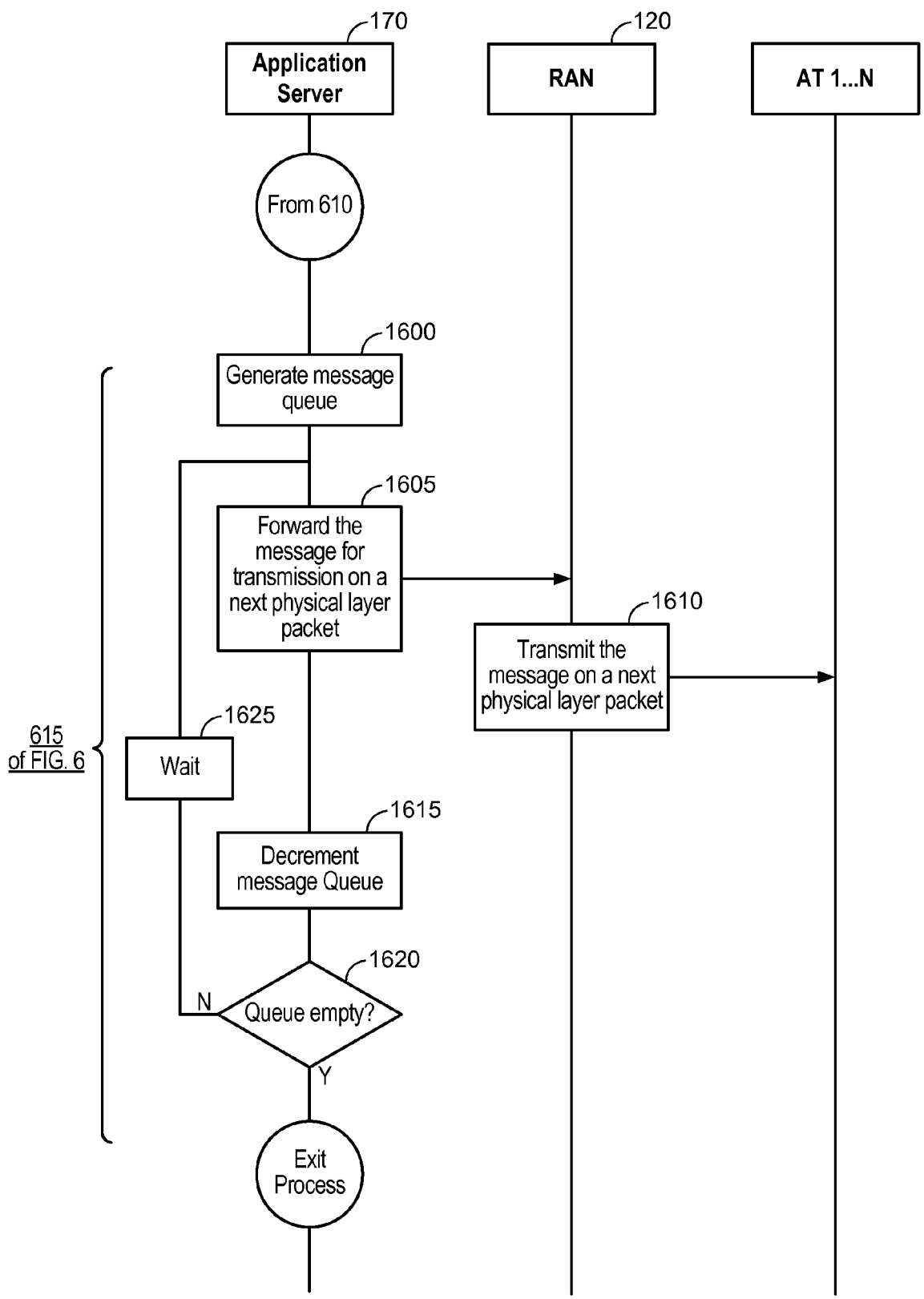
FIG. 16 illustrates an application server-based message repetition scheduling process according to an embodiment of the present invention.

FIG. 16 illustrates an application server-based message repetition scheduling process according to an embodiment of the present invention. Referring to FIG. 16, assume that the application server 170 knows the interval between physical layer packet transmissions at the RAN 120. Also, the process of FIG. 16 has been described as performed within 615 of FIG. 6. However, it will be appreciated that, in other embodiments of the invention, the staggered message transmission described with respect to FIG. 16 can be applied to any application server-based message repetition protocol.

Accordingly, after 610 of FIG. 6, the process advances to 1600 of FIG. 16. In 1600, the application server 170 generates a message repetition queue for facilitating the transmission of the message X times. For example, a counter $X_{current}$ can be set equal or initialized to X in 1625. Next, in 1605, the application server 170 forwards the message to the RAN 120 for transmission to ATs 1 . . . N on a next physical layer packet. The RAN 120 receives the forwarded message and transmits the message on the next physical layer packet, 1610.

Referring to FIG. 16, in 1615, the application server 170 decrements the counter $X_{current}$, or message queue, (e.g., $X_{next}=X_{current}-1$), and then determines whether the message queue is empty. For example, if the decremented counter $X_{next}$ is equal to zero (0), then the message queue is empty. If $X_{next}$ equals 0, then the process terminates. Otherwise, if $X_{next}$ does not equal 0, the process advances to 1625. In 1625, the application server 170 waits a given amount of time before returning to 1605 to transmit another message repetition, where $X_{next}$ becomes $X_{current}$ for the next iteration. For example, the application server 170 may wait for a period of time equal to an interval between physical layer packets at the RAN 120. In another example, the application server 170 can wait a minimum amount of time necessary to ensure that the next message repetition transmission (e.g., which may not necessarily be the physical layer packet interval) in 1605 will not be transmitted on the same physical layer packet as a previous message repetition transmission. Accordingly, as will be appreciated by one of ordinary skill in the art, the application server 170 can control the forwarding of message repetitions to the RAN 120 for transmission to ensure that multiple message repetitions are not bundled on the same physical layer packet.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of transmitting messages in a wireless communication system, comprising:
   determining whether to transmit a given multicast message to at least one access terminal multiple times;
   determining a number of times to transmit the given multicast message if the given multicast message is to be transmitted multiple times;
   configuring a given multicast message to include a flag indicating the determined number of times; and
   forwarding the given multicast message for transmission to the at least one access terminal.

2. The method of claim 1, wherein the at least one access terminal includes a plurality of access terminals and the given multicast message is a multicast message or a broadcast message.

3. The method of claim 2, wherein the given multicast message is one of an announce message that announces a multicast session, an end message that terminates the multicast session and an overhead message that indicates information regarding how to tune to the multicast session.

4. The method of claim 3, wherein the given multicast message corresponds to a broadcast overhead message (BOM), and the BOM is determined to be transmitted multiple times during a beginning portion of the multicast session within a single BOM period.

5. The method of claim 1, wherein determining the number of times to transmit the given multicast message is based on a message type of the given multicast message.

6. The method of claim 5, wherein determining the number of times to transmit the given multicast message includes:
   comparing the message type of the given multicast message with a message repetition table that indicates transmission repetition values for a plurality of different message types, and
   setting the determined number of times to transmit the given multicast message equal to a transmission repetition value associated with a matching message type within the message repetition table based on the comparison.

7. The method of claim 1, wherein the transmitting step attempts to schedule the transmission of each message repetition on different physical layer packets.

8. The method of claim 1, wherein a transmission origination of each repetition of the given multicast message originates at an application server.

9. The method of claim 8, wherein the transmitting step includes:
   initializing a counter equal to the determined number of times;
   forwarding the given multicast message to an access network for transmission to the at least one access terminal on a given physical layer packet;
   decrementing the counter;
   determining whether the decremented counter indicates that the given multicast message has been transmitted the determined number of times; and
   if the decremented counter indicates that the given multicast message has not been transmitted the given number of times, waiting a given amount of time and repeating the forwarding, decrementing and determining steps.

10. The method of claim 9, wherein the given amount of time is based on an interval between physical layer packet transmissions at the access network.

11. The method of claim 1, wherein a transmission origination of each repetition of the given multicast message originates at an access network.

12. The method of claim 1, wherein the determining the number of times is performed at an application server and the transmitting step
   forwards the given multicast message to an access network.

13. The method of claim 12, wherein the transmitting step further includes:
   receiving the given message at the access network;
   extracting the flag from the given message to determine the number of times to transmit the given multicast message at the access network; and
   transmitting, from the access network, the given multicast message the number of times indicated by the extracted flag.

14. The method of claim 13, further comprising:
   scheduling each transmission of the given multicast message from the access network on different physical layer packets.

15. The method of claim 1, wherein the flag is a Differentiated Services Code Point (DSCP) value in a header portion of the given multicast message.

16. A method of transmitting messages in a wireless communication system, comprising:
   receiving a given multicast message for transmission to at least one access terminal;
   extracting a flag from the given multicast message;
   determining a number of times to transmit the given multicast message to the at least one access terminal based at least in part on the extracted flag; and
   transmitting the given multicast message the determined number of times to the at least one access terminal.

17. The method of claim 16, wherein the extracted flag indicates the number of times to transmit the given multicast message.

18. The method of claim 16, wherein the extracted flag indicates a priority of the given multicast message.

19. The method of claim 18, wherein the determining step determines the number of times to transmit the given multicast message by:
  comparing the priority of the given multicast message with a priority table that indicates transmission repetition values for different message priorities, and
  setting the determined number of times to transmit the given multicast message equal to a transmission repetition value associated with a matching priority within the priority table based on the comparison.

20. The method of claim 18, wherein the priority indicated by the extracted flag is used in combination with one or more sector-specific factors to determine the number of times to transmit the given multicast message on a sector by sector basis.

21. The method of claim 20, wherein the one or more sector-specific factors includes channel conditions.

22. The method of claim 16, wherein the at least one access terminal includes a plurality of access terminals and the given multicast message is a multicast message or a broadcast message.

23. The method of claim 22, wherein the given multicast message is one of an announce message that announces a multicast session, an end message that terminates the multicast session and an overhead message that indicates information regarding how to tune to the multicast session.

24. The method of claim 16, wherein the transmitting step attempts to schedule the transmission of each message repetition on different physical layer packets.

25. The method of claim 16, wherein a transmission origination of each repetition of the given multicast message originates at an access network.

26. The method of claim 25, wherein the transmitting step includes:
  initializing a counter equal to the determined number of times;
  transmitting the given multicast message to the at least one access terminal on a given physical layer packet;
  decrementing the counter;
  determining whether the decremented counter indicates that the given multicast message has been transmitted the determined number of times; and
  if the decremented counter indicates that the given multicast message has not been transmitted the given number of times, waiting a given amount of time and repeating the forwarding, decrementing and determining steps.

27. The method of claim 26, wherein the given amount of time is based on an interval between physical layer packet transmissions at the access network.

28. The method of claim 26, further comprising:
  scheduling each transmission of the given multicast message from the access network on different physical layer packets.

29. The method of claim 16, wherein the extracted flag is a Differentiated Services Code Point (DSCP) value in a header portion of the given multicast message.

30. A method of transmitting messages in a wireless communication system, comprising:
  determining a priority associated with a given multicast message for transmission to at least one access terminal;
  configuring the given multicast message to include a flag that indicates the priority of the given multicast message; and
  forwarding the configured multicast message to an access network for transmission to the at least one access terminal a number of times based at least in part on the priority indicated by the flag.

31. The method of claim 30, wherein the priority indicated by the configured multicast message is configured to be used in combination with one or more sector-specific factors at the access network to determine the number of times to transmit the given multicast message on a sector by sector basis.

32. The method of claim 31, wherein the one or more sector-specific factors includes channel conditions.

33. The method of claim 30, wherein the at least one access terminal includes a plurality of access terminals and the given multicast message is a multicast message or a broadcast message.

34. The method of claim 33, wherein the given multicast message is one of an announce message that announces a multicast session, an end message that terminates the multicast session and an overhead message that indicates information regarding how to tune to the multicast session.

35. The method of claim 34, wherein the given multicast message corresponds to a broadcast overhead message (BOM), and the BOM is determined to be transmitted multiple times during a beginning portion of the multicast session within a single BOM period.

36. The method of claim 30, wherein the configured multicast message includes a Differentiated Services Code Point (DSCP) value in a header portion that indicates the priority to the access network.

37. A communication apparatus within a wireless communication system, comprising:
  means for determining whether to transmit a given multicast message to at least one access terminal multiple times;
  means for determining a number of times to transmit the given multicast message if the given multicast message is to be transmitted multiple times;
  means for configuring a given multicast message to include a flag indicating the determined number of times; and
  means for forwarding the given multicast message for transmission to the at least one access terminal.

38. The communication apparatus of claim 37, wherein the means for determining the number of times to transmit the given multicast message determines the number of times based on a message type of the given multicast message.

39. The communication apparatus of claim 37, wherein the communication apparatus corresponds to an application server within the wireless communications system.

40. The communication apparatus of claim 39, wherein the means for forwarding forwards the given multicast message to an access network.

41. The communication apparatus of claim 37, wherein the communication apparatus corresponds to an access network within the wireless communications system.

42. An access network, comprising:
  means for receiving a given multicast message for transmission to at least one access terminal;
  means for extracting a flag from the given multicast message;
  means for determining a number of times to transmit the given multicast message to the at least one access terminal based at least in part on the extracted flag; and
  means for transmitting the given multicast message the determined number of times to the at least one access terminal.

43. The access network of claim 42, wherein the extracted flag indicates the number of times to transmit the given multicast message.

44. The access network of claim 42, wherein the extracted flag indicates a priority of the given multicast message.

45. The access network of claim 42, wherein the means for transmitting attempts to schedule the transmission of each message repetition on different physical layer packets.

46. An application server, comprising:
- means for determining a priority associated with a given multicast message for transmission to at least one access terminal;
- means for configuring the given multicast message to include a flag that indicates the priority of the given multicast message; and
- means for forwarding the configured multicast message to an access network for transmission to the at least one access terminal a number of times based at least in part on the priority indicated by the flag.

47. A communication apparatus within a wireless communication system, comprising:
- logic configured to determine whether to transmit a given multicast message to at least one access terminal multiple times;
- logic configured to determine a number of times to transmit the given multicast message if the given multicast message is to be transmitted multiple times;
- logic configured to configure a given multicast message to include a flag indicating the determined number of times; and
- logic configured to forward the given multicast message for transmission to the at least one access terminal,
- wherein one or more of the logic configured to determine whether to transmit, the logic configured to determine a number and the logic configured to transmit corresponds to hardware or a combination of hardware and software.

48. The communication apparatus of claim 47, wherein the logic configured to determine the number of times to transmit the given multicast message determines the number of times based on a message type of the given multicast message.

49. The communication apparatus of claim 47, wherein the communication apparatus corresponds to an application server within the wireless communications system.

50. The communication apparatus of claim 49, wherein the logic configured to forward forwards the given multicast message to an access network.

51. The communication apparatus of claim 47, wherein the communication apparatus corresponds to an access network within the wireless communications system.

52. An access network, comprising:
- logic configured to receive a given multicast message for transmission to at least one access terminal;
- logic configured to extract a flag from the given multicast message;
- logic configured to determine a number of times to transmit the given multicast message to the at least one access terminal based at least in part on the extracted flag; and
- logic configured to transmit the given multicast message the determined number of times to the at least one access terminal,
- wherein one or more of the logic configured to receive, the logic configured to extract, the logic configured to determine and the logic configured to transmit corresponds to hardware or a combination of hardware and software.

53. The access network of claim 52, wherein the extracted flag indicates the number of times to transmit the given multicast message.

54. The access network of claim 52, wherein the extracted flag indicates a priority of the given multicast message.

55. The access network of claim 52, wherein the logic configured to transmit attempts to schedule the transmission of each message repetition on different physical layer packets.

56. An application server, comprising:
- logic configured to determine a priority associated with a given multicast message for transmission to at least one access terminal;
- logic configured to configure the given multicast message to include a flag that indicates the priority of the given multicast message; and
- logic configured to forward the configured multicast message to an access network for transmission to the at least one access terminal a number of times based at least in part on the priority indicated by the flag,
- wherein one or more of the logic configured to determine, the logic configured to configure and the logic configured to forward corresponds to hardware or a combination of hardware and software.

57. A non-transitory computer-readable medium comprising instructions, which, when executed by a communication apparatus within a wireless communications system, cause the communication apparatus to perform operations, the instructions comprising:
- program code to determine whether to transmit a given multicast message to at least one access terminal multiple times;
- program code to determine a number of times to transmit the given multicast message if the given multicast message is to be transmitted multiple times;
- program code to configure a given multicast message to include a flag indicating the determined number of times; and
- program code to forward the given multicast message for transmission to the at least one access terminal.

58. The non-transitory computer-readable medium of claim 57, wherein the logic configured to determine the number of times to transmit the given multicast message determines the number of times based on a message type of the given multicast message.

59. The non-transitory computer-readable medium of claim 57, wherein the communication apparatus corresponds to an application server within the wireless communications system.

60. The non-transitory computer-readable medium of claim 59, wherein the
- program code to forward forwards the given multicast message to an access network.

61. The non-transitory computer-readable medium of claim 57, wherein the communication apparatus corresponds to an access network within the wireless communications system.

62. A non-transitory computer-readable medium comprising instructions, which, when executed by an access network within a wireless communications system, cause the access network to perform operations, the instructions comprising:
- program code to receive a given multicast message for transmission to at least one access terminal;
- program code to extract a flag from the given multicast message;
- program code to determine a number of times to transmit the given multicast message to the at least one access terminal based at least in part on the extracted flag; and
- program code to transmit the given multicast message the determined number of times to the at least one access terminal.

63. The non-transitory computer-readable medium of claim 62, wherein the extracted flag indicates the number of times to transmit the given multicast message.

64. The non-transitory computer-readable medium of claim 62, wherein the extracted flag indicates a priority of the given multicast message.

65. The non-transitory computer-readable medium of claim 62, wherein the program code to transmit attempts to schedule the transmission of each message repetition on different physical layer packets.

66. A non-transitory computer-readable medium comprising instructions, which, when executed by an application server within a wireless communications system, cause the application server to perform operations, the instructions comprising:

program code to determine a priority associated with a given multicast message for transmission to at least one access terminal;

program code to configure the given multicast message to include a flag that indicates the priority of the given multicast message; and program code to forward the configured multicast message to an access network for transmission to the at least one access terminal a number of times based at least in part on the priority indicated by the flag.

* * * * *